US009805402B1

(12) United States Patent
Maurer et al.

(10) Patent No.: US 9,805,402 B1
(45) Date of Patent: Oct. 31, 2017

(54) ADAPTIVE CONTROL OF AN ITEM INVENTORY PLAN

(71) Applicant: Amazon Technologies, Inc., Seattle, WA (US)

(72) Inventors: Jeffrey B. Maurer, Port Orchard, WA (US); Deepak Bhatia, Issaquah, WA (US); Gordon Mitchell Goetz, Seattle, WA (US); Onur Özkök, Issaquah, WA (US); Tolga Han Seyhan, Seattle, WA (US); Nicholas Deming Sherman, Seattle, WA (US); Arjun Krishna Subramaniam, Seattle, WA (US); Jingchen Wu, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 481 days.

(21) Appl. No.: 14/499,037

(22) Filed: Sep. 26, 2014

(51) Int. Cl.
*G06Q 30/00* (2012.01)
*G06Q 30/06* (2012.01)
*G06Q 10/08* (2012.01)

(52) U.S. Cl.
CPC ....... *G06Q 30/0605* (2013.01); *G06Q 10/087* (2013.01)

(58) Field of Classification Search
CPC .......................................... G06Q 30/06–30/08
USPC ................................................ 705/26.1–27.2
See application file for complete search history.

(56) References Cited

U.S. PATENT DOCUMENTS

| 7,499,766 B2 | 3/2009 | Knight et al. |
| 2011/0130857 A1* | 6/2011 | Budiman ......... G05B 19/41875 700/104 |
| 2014/0200964 A1* | 7/2014 | Hassanzadeh ..... G06Q 30/0283 705/7.35 |

OTHER PUBLICATIONS

Powell, W.B., "Stochastic Approximation Methods" in Approximate Dynamic Programming: Solving the Curses of Dimensionality (New Jersey, Wiley, 2007), pp. 179-224.*
Kunnumkal, S. and H. Topaloglu. "Using Stochastic Approximation Methods to Compute Optimal Base-Stock Levels," *Operations Research* 56(3), May-Jun. 2008, pp. 646-664.
Powell, W. B., "Stochastic Approximation Methods." in: *Approximate Dynamic Programming: Solving the curses of dimensionality.* (New Jersey, Wiley, 2007), pp. 179-224.

(Continued)

*Primary Examiner* — Ethan D Civan
(74) *Attorney, Agent, or Firm* — Kilpatrick Townsend & Stockton LLP

(57) ABSTRACT

Techniques for determining a decision to acquire units of an item to be inventoried may be provided. For example, a demand for an item may be simulated to determine a consumption of a capacity for inventorying the item. A discrepancy between the consumption of the capacity and the capacity may be determined. An opportunity cost associated with the capacity may be updated based at least in part on determining that the discrepancy fails a convergence criterion. The opportunity cost may indicate a value associated with using the capacity. The consumption of the capacity may be simulated based at least in part on the updated opportunity cost. A resulting discrepancy may be determined. If the resulting discrepancy meets the convergence criterion, the decision to acquire the units of the item may be generated based at least in part on the updated opportunity cost.

20 Claims, 13 Drawing Sheets

(56) References Cited

OTHER PUBLICATIONS

Zipkin, P. "Time-Varying, Stochastic Demand: Policy Optimization." in: *Foundations of Inventory Management.* (McGraw-Hill, 2000), pp. 365-376.

Zipkin, P. "On the Structure of Lost-Sales Inventory Models." *Operations Research* 56(4), Jul.-Aug. 2008, pp. 937-944.

Zipkin, P. "Old and New Methods for Lost-Sales Inventory Systems." *Operations Research* 56(5), Sep.-Oct. 2008, pp. 1256-1263.

\* cited by examiner

_US 9,805,402 B1_

ADAPTIVE CONTROL OF AN ITEM INVENTORY PLAN

CROSS-REFERENCE TO RELATED APPLICATIONS

This application is also related to and incorporates by reference for all purposes the full disclosure of co-pending U.S. patent application Ser. No. 14/499,017, filed Sep. 26, 2014, entitled "ADAPTIVE CONTROL AND MODELING OF INVENTORY", and co-pending U.S. patent application Ser. No. 14/499,019, filed Sep. 26, 2014, entitled "DETERMINING AN INVENTORY PLAN FOR AN ITEM".

BACKGROUND

More and more users are turning to network-based resources, such as electronic marketplaces, to purchase items (e.g., goods and/or services), A network-based resource may provide a user experience unmatched by a more traditional brick and mortar store. For example, the network-based resource may offer a larger and more diverse selection of items. Further, for some of the items, there may be a number of sellers with different offers. As such, a consumer may not only have access to a rich item selection, but may also obtain items at the most convenient offers.

Typically, a service provider of a network-based resource may coordinate with multiple entities to offer items. For example, the service provider may communicate with sellers to list the items at the network-based resource and with inventory planners to acquire and store a certain number of the items in storage.

BRIEF DESCRIPTION OF THE DRAWINGS

Various embodiments in accordance with the present disclosure will be described with reference to the drawings, in which.

DETAILED DESCRIPTION

Figure 1:
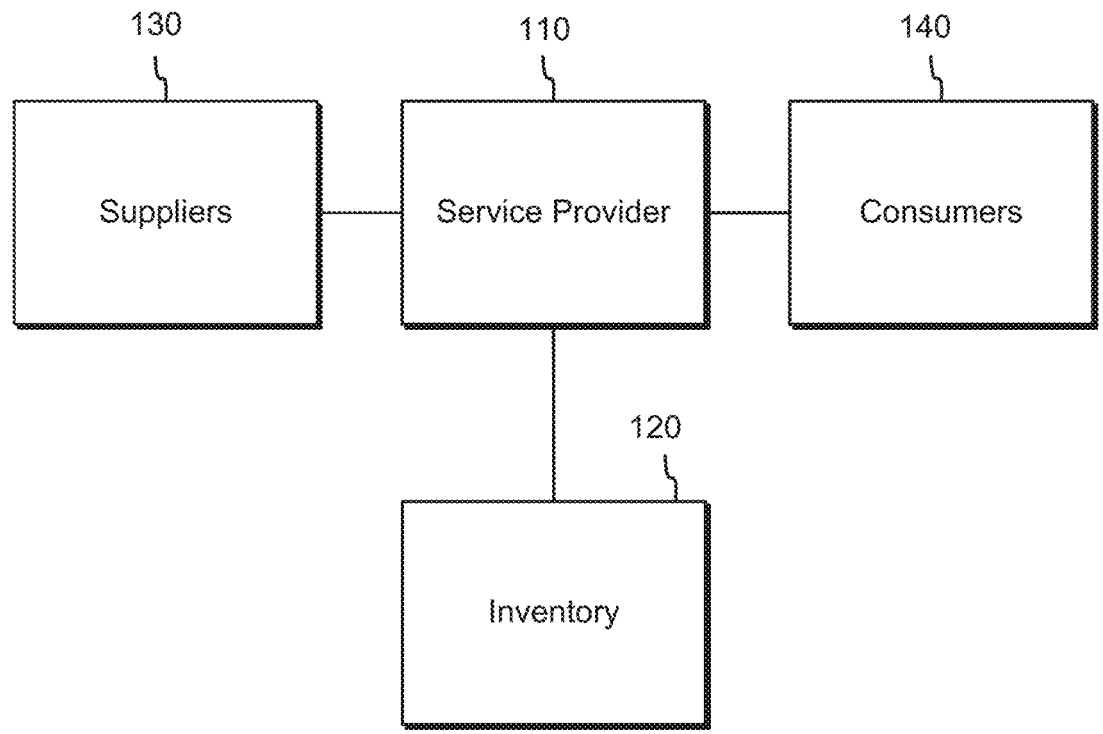
FIG. 1 is a block diagram illustrating an example environment for offering items at a network-based resource, according to embodiments.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Embodiments of the present disclosure are directed to, among other things, enhancing item inventory planning. Typically, a service provider of a network-based resource, such as an electronic marketplace, may operate various computing devices and associated services to offer items at the network-based resource. Some of the items may be obtained from sellers and/or other entities, stored in an inventory, and offered to consumers as in-stock items. A consumer may be enticed to purchase an in-stock item because of, for example, a shorter delivery flow. However, the supply and demand can be stochastic. In certain situations, predicting what the sellers can supply or what the consumers may request can be challenging. Accordingly, determining what and how many items should be inventoried may also be stochastic.

To help with the inventory planning, the service provider may use an inventory management system. That system may implement a number of tools including, for example, an adaptive capacity control tool and a multi-period ordering model tool. The adaptive capacity control tool may be configured to generate, based on a set of constraints associated with inventory capacities, a set of opportunity costs over a time horizon (e.g., a plurality of weeks or months). An opportunity cost can be generated for a category of items by, for example, simulating consumptions of a capacity, such as an inventory capacity, over the time horizon to determine an optimized use of the capacity. This opportunity cost may represent a value, such as a cost, associated with storing that category of items during the time horizon. The multi-mode ordering model may be configured to use the opportunity cost and other parameters to generate various purchase plans. A purchase plan may include a decision to acquire a number of units of a particular item from a category of items within an immediate short time period (e.g., next week) and an inventory plan for acquiring additional units during the remaining portion of the time horizon. As such, the multi-mode ordering model may take into account future constraints for a category of items over an entire time horizon to generate a purchase decision for a particular item on the short term.

To illustrate, consider a consumer demand peak, such as one observed during a holiday season. Demand may exceed inventoried items. A service provider may react by attempting to increase the inventory in an ad-hoc manner. However, sellers may not have the capacity to timely satisfy the surge in demand. By implementing the adaptive capacity control tool and the multi-period ordering model tool, the service provider may consider constraints over a long time horizon up to and including the peak, such as a fifteen week time period. The constraints may be associated with the capacity of the service to receive and store items in an inventory. The constraints may also include seller capacities to provide the items. The adaptive capacity control tool may allow the service provider to perceive a value of stocking a certain category of items (e.g., jewelry, books, or other categories) across the fifteen weeks given the various capacity constraints. This value can be used by the multi-period ordering tool to determine how many units of a particular item (e.g., particular diamond earrings, book title, or other items) should be purchased and stored over time. For example, the multi-period ordering model tool may generate a number of units for the first week. This number of units may not only satisfy the potential consumer demand in that first week, but may also account for the potential capacity constraints in the fifteenth week. As such, the generated purchase plan may provide buy-in early decisions, and/or buy-in late decisions, in each time period (e.g., week) of the time horizon given the capacity constraints of the time periods. Accordingly, the plan can help manage the capacity constraints over the time horizon and mitigate potential risks.

The adaptive capacity control tool and the ordering multi-period ordering model tool may each or in conjunction efficiently derive and use values (e.g., opportunity costs, ordering decisions), This may involve running various simulation functions, optimization functions and/or models to search for the values across a large dataset and can include iteratively exchanging data between the two tools. The values can be found based on convergence criteria. Implementing the functions, models, iterations, and/or convergence criteria on a computing system can translate to an improved memory management, computational cost, dataset search and processing of the computing system.

In the interest of clarity of explanation, the embodiments are described in the context of a category of items offered at a network-based resource of a service provider and inventoried at an inventory associated with the service provider. Nevertheless, the embodiments may not be limited as such. Instead, the embodiments may similarly apply to any network-based resource (e.g., a network site, a network-based store, a data store, an electronic marketplace, a data center, a hosting computing environment, or any other network-based resource), a service provider of the network-based resource (e.g., an administrator, an authorized entity, a provider of a service over a network, or any other service provider), any item (e.g., tangible items, intangible items, or a description or representation in a computer system or electronic catalog of an item), any groupings of items (e.g., a category based on similarity of features, type, end use, a category defined by a service provider, or any other category), and any inventory (e.g., a physical or virtual warehouse operated by the service provider, by a seller, or by a third party entity).

Turning to FIG. 1, the figure illustrates an example environment for offering inventoried and non-inventoried items. More particularly, the illustrated environment includes a. service provider 110 having access to an inventory 120 of items. The service provider 110 may obtain some of the items from suppliers 130 or from other sources. The service provider 110 may store the obtained items in the inventory 120 until ordered by consumers 140. The consumers 140 may include recipients or end-users of the items. However, not all of the items may be inventoried. Instead, the service provider 110 may facilitate a service for the consumers 140 to obtain items directly from the suppliers 130 or from other sources.

In an embodiment, the service provider 110 may operate a network-based resource, such as electronic marketplace, to provide various types of services. Generally, the network-based resource may provide network pages or documents associated with and/or describing the items offered through the marketplace ("item pages" or "item detail pages"). An item page may include information about an item, such as descriptions of the item, related offers, identifiers of suppliers of the item, and other information. Among this information, the item page may display an in-stock attribute for the item An in-stock attribute may represent an indication that the item may be or is about to be available in the inventory 120. In comparison, if the item is not available, the item page may display an out-of-stock attribute.

The inventory 120 may represent a warehouse, a fulfillment center, a data center, a content distribution center, or some other storage resource for storing items. Typically, an inventory management system may control operations of the inventory 120. An example inventory management system is further described in FIGS. 2 and 3. In an example, the service provider 110 may operate the inventory management system. For instance, various entities or organizations represented by the service provider 110 may provide input to and receive output from the inventory management system. To illustrate, a manager of a particular item category (e.g., televisions) may use the inventory management system to search and find the number of inventoried items of that category and to input data related to a capacity to store additional items in the inventory 120. In another example, the suppliers 140 and/or third parties may additionally or alternatively operate the inventory management system. For instance, the suppliers 140 may input information in the inventory management system describing the various available items, lead times, capacity to provide the items, and other supplier related information.

The consumers 140 may operate computing devices to access the network-based resource over a network. This access can include various types of interactions, such as browsing, searching, purchasing, returning, and/or reviewing items. In particular, a consumer may access an item page associated with an item, review the information about the item, and make a purchasing decision. As part of the purchase decision, the consumer may consider the in-stock attribute. For example, the consumer may be enticed to purchase the in-stock item over an out-of-stock item because of the potentially shorter delivery time.

Figure 2:
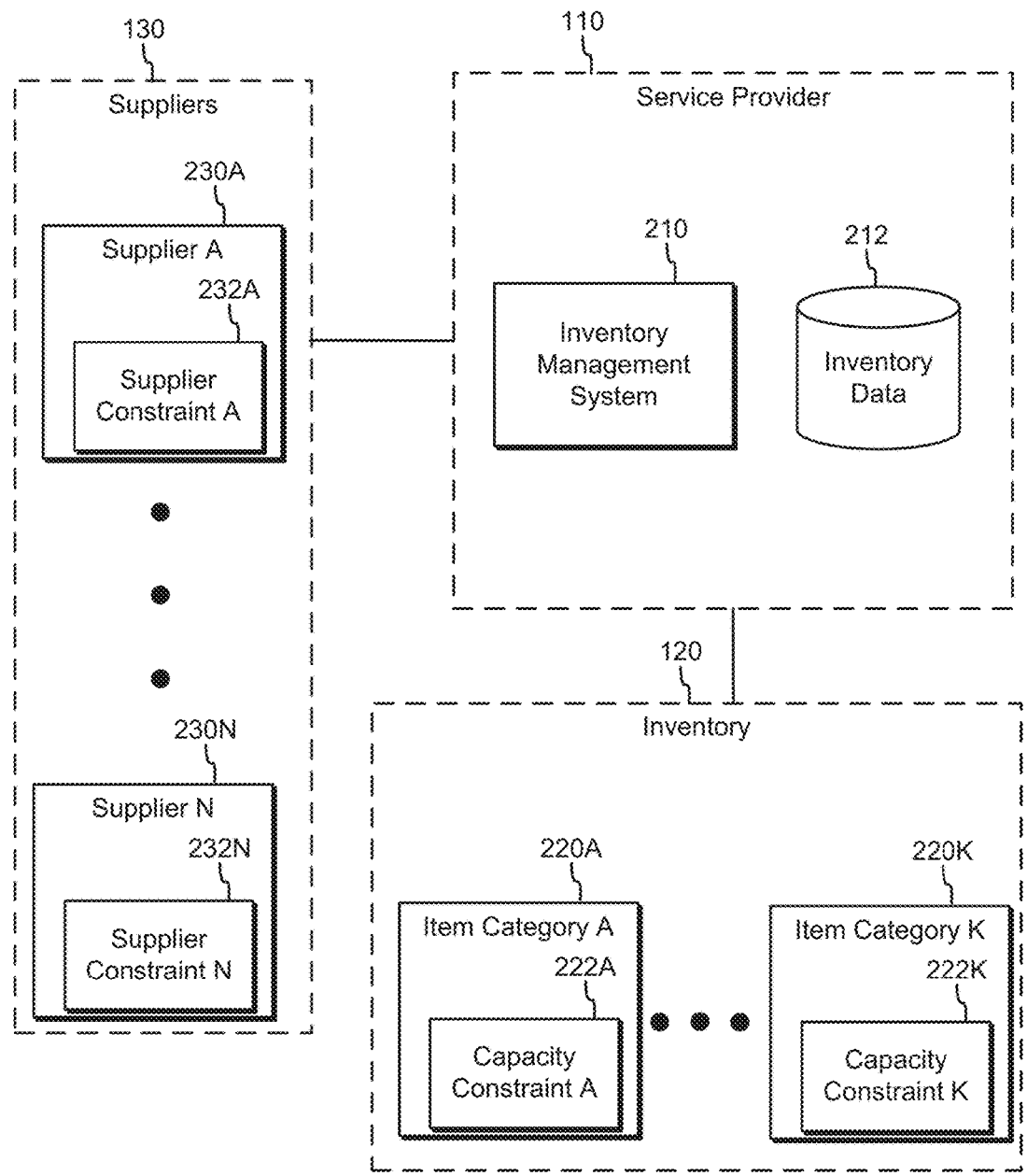
FIG. 2 is a block diagram illustrating example constraints associated with offering items, according to embodiments.

Turning to FIG. 2, the figure provides a further illustration of the example environment for offering items. In particular, the service provider 110 may operate an inventory management system 210 and may manage inventory data 212. The inventory management system 210 may use the inventory data to perform various inventory-related operations. For example, the inventory management system 210 may be implemented as a service on a computer system or may be specialized computing hardware configured to access, process, and output inventory data 212. A database or some other storage type may store the inventory data 212. The inventory data 212 may represent data related to the inventory 120. The inventory management system 210 may be configured to plan for stocking items, track which items may be in-stock, which items may be out-of-stock, order and stock additional units of items, and other inventory-related operations. The inventory management system 210 may also implement an adaptive capacity control tool and an ordering model tool as further illustrated in FIG. 3. The inventory data 212 may include data associated with the various inventory management system 210 operations.

Similarly, operators of the inventory 120 operate various computing systems to interface with the inventory management system 210. The operators of the inventory 120 may be the same or a different entity than the service provider 110. in particular, the operators may provide information about item categories 220A-K. The information may include, for example, an identifier of an item category, identifiers of items of that category, quantities of stored items, and/or other item-related information. In addition, some of the information may relate to capacity constraints 222A-K. A capacity constraint may include a receipt constraint and a storage constraint. A receipt constraint may represent available labor and resources to receive and prepare an item for storage. A storage constraint may represent available storage space (e.g., physical storage volume such as cubic foot, data storage volume such as Gigabyte, etc.). Further, a capacity constraint can be defined for an item category. For example, a fifty thousand cubic feet of capacity constraint can be allocated to televisions, In addition, a capacity constraint can be expressed as a function over time. For example, for a plurality of time periods forming a time horizon (e.g., fifteen weeks), the capacity constraint can be defined per time period (e.g., per week) and can fluctuate from one time period to another. The information about the items, the item categories 220A-K, and the capacity constraints 222A-K may be inputted at an interface to the inventory management system 210 and stored as part of the inventory data 212.

The suppliers 130, illustrated as suppliers 230A-N, may likewise operate computing systems to interface with the inventory management system 210. Each of the suppliers 230A-N may be a seller, reseller, retailer, merchant, manufacturer, vendor, and/or another entity involved in providing items of a same item category or of different item categories. Further, each of the suppliers 230A-N may be associated with a supplier constraint 232A-N. A supplier constraint may represent a capacity of a supplier to provide an item within a certain time period or across a plurality of time periods. For example, a supplier constraint may account for a lead time to manufacture and deliver an item. By interfacing with the inventory management system 210, the suppliers 230A-N may input information associated the various items including the supplier constraints 232A-N. In turn, this information can be stored as part of the inventory data 212.

In an embodiment, the capacity constraints 222A-222K and/or the supplier constraints 232A-232N may not be inputted into the inventory management system 210. Instead, the inventory management system 210 may analyze some of the inventory data 212 to derive the constraints. For example, the inventory management system 210 may analyze historical data associated with past deliveries to determine the supplier constraints 232A-232N. Similarly, the inventory management system may analyze historical data associated with past capacity constraints to determine the capacity constraints 222A-K.

As explained herein above, the service provider 110, operators of the inventory 120, and the suppliers 130 may operate various computing systems. These computing systems may be any type of computing device such as, but not limited to, a mobile phone, a smart phone, a personal digital assistant (PDA), a laptop computer, a desktop computer, a server computer, a thin-client device, a tablet PC, etc. The computing systems may also contain communications connection(s) that allow communications with a stored database, servers, client devices, and/or other computing devices on a network. The computing systems may also include input/output (I/O) device(s) and/or ports, such as for enabling connection with a keyboard, a mouse, a pen, a voice input device, a touch input device, a display, speakers, a printer, etc.

In an embodiment, the computing systems of the service provider 110 may, in some examples, provide network-based resources such as, but not limited to, applications for purchase and/or download, network sites, client entities, data storage, data access, management, virtualization, etc. The computing systems of the service provider 110 may also be operable to provide web hosting, computer application development, implementation platforms, or combinations of the foregoing to client devices.

Additionally, in some embodiments, the computing systems of the service provider 110 may be executed by one more virtual machines implemented in a hosted computing environment. The hosted computing environment may include one or more rapidly provisioned and released network-based resources. Such network-based resources may include computing, networking, and/or storage devices. A hosted computing environment may also be referred to as a "cloud" computing environment. In some examples, the computing systems of the service provider 110 may include one or more servers, perhaps arranged in a cluster, or as individual servers not associated with one another.

In one illustrative configuration, the computing systems of the service provider 110 may include at least one or more processing units (or processor devices(s)) and one memory. The processor device(s) may be implemented as appropriate in hardware, or as computer-executable instructions, software or firmware implemented in hardware. Computer-executable instructions or firmware implemented by the processor device(s) may include computer-executable or machine-executable instructions written in any suitable programming language to perform the various functions described.

The memory may store program instructions that are loadable and executable on the processor device(s), as well as data generated during the execution of these programs, Depending on the configuration and type of the computing systems of the service provider 110, the memory may be volatile (such as random access memory (RAM)) and/or non-volatile (such as read-only memory (ROM), flash memory, etc.). The computing systems of the service provider 110 may also include additional removable storage and/or non-removable storage including, but not limited to, magnetic storage, optical disks, and/or tape storage. The disk drives and their associated non-transitory computer-readable media may provide non-volatile storage of computer-readable instructions, data structures, program modules, and other data for the computing devices. In some implementations, the memory may include multiple different types of memory, such as static random access memory (SRAM), dynamic random access memory (DRAM), or ROM.

As described herein above, the inventory management system 210 can implement an adaptive capacity control tool and a multi-period ordering tool. The adaptive capacity control tool can be configured to provide data related to best uses of an inventory space given various constraints over a time horizon, such as the capacity constraint 222AK and/or the supplier constraints 232A-N. The multi-period ordering model tool can be configured to provide purchase decisions over a time period given the constraints over the entire time horizon.

In comparison, existing systems may not implement adaptive capacity control tool and a multi-period ordering tool. Instead, manual and/or ad-hoc processes may be implemented, For example, if a receipt capacity is exceeded, a service provider may stop stocking particular items. In certain situations, if a storage capacity is underused, the service provider may decide to stock additional units of items. However, the service provider typically may not consider constraints over a time horizon to optimize uses of available capacity over that entire time horizon. For example, the service provider may not implement a service to allow early and late purchasing to balance the available capacities. Similarly, the service provider may implement a single time period purchasing tool. That tool may approximate what should be bought in a single time period given parameters related to that time period. However, the tool may not typically consider constraints over the entire time horizon to generate the single time period purchase decision.

As demand and supply can fluctuate, sometime stochastically, existing systems may under or over use capacities. To illustrate, consider a consumer demand peak, such as one observed during a holiday season. The existing systems may allow two scenarios. In a first scenario, a service provider can adopt a reactive approach. In particular, if during the peak, a certain high demand item may no longer be available, the service provider may react and attempt to obtain and store additional units of the item. However, suppliers of the item may not be able to supply the additional unites of the item on time (e.g., during the peak period). Even if supplied, not enough capacity may exist to inventory (e.g., receive and store) the units. Thus, in certain situations, the item may become and remain out-of-stock during the entire peak. As a result, consumers may shop elsewhere. Further, once the peak elapses and the obtained items are inventoried, there may no longer be a demand, Thus, the service provider may carry excess inventory. In a second scenario, the service provider can adopt a proactive approach. Under this approach, the service provider can set aside a certain capacity margin, However, under-use of the capacity can result. For example, if an item does not go out-of-stock, the service provider may have wasted the reserved capacity margin. Even if the item goes out-of-stock, the suppliers may still not be able to deliver additional units and, thus, the capacity may also be under used.

Figure 3:
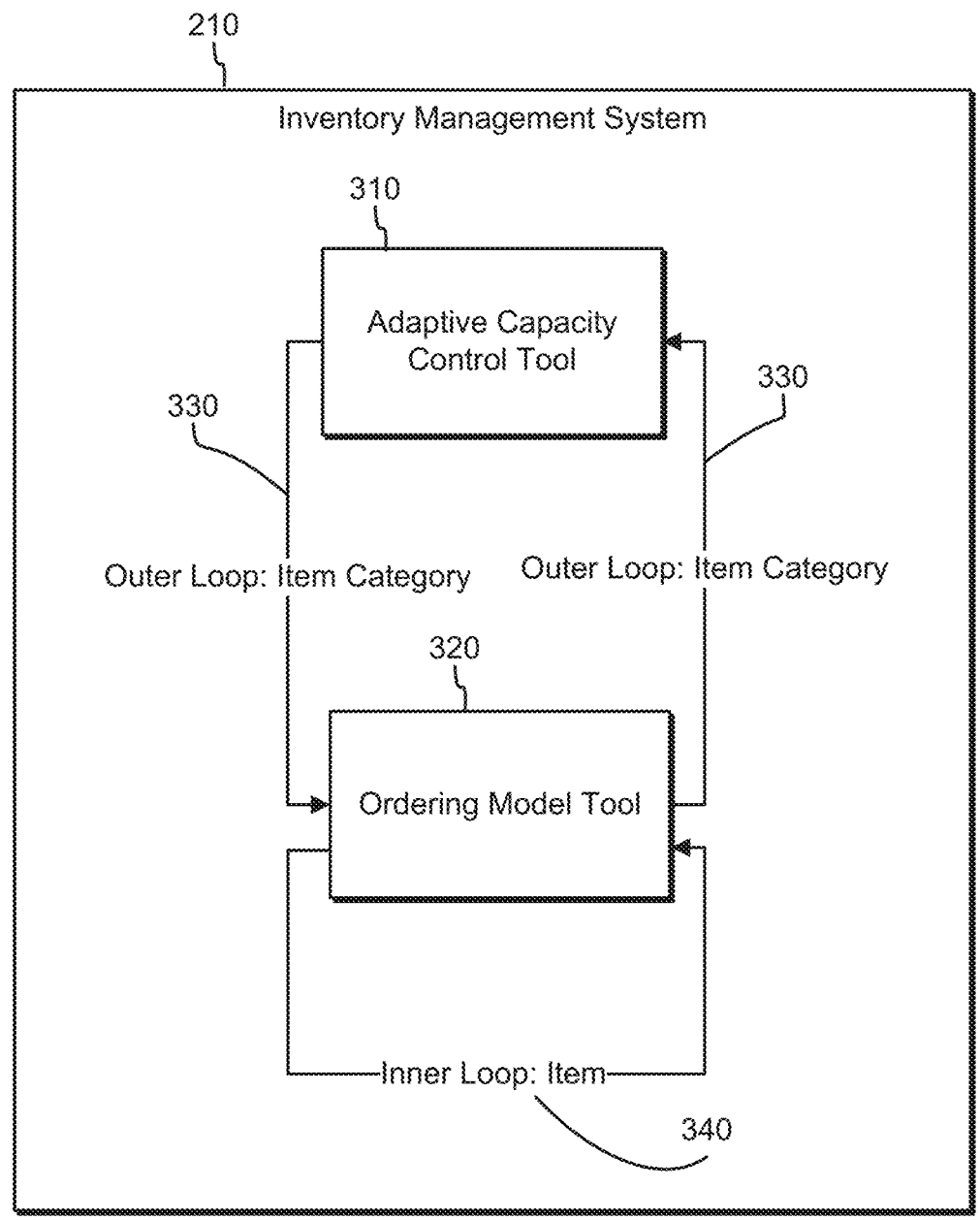
FIG. 3 is a block diagram illustrating an example inventory management system configured to manage inventorying of items, according to embodiments.

Turning to FIG. 3, the figure provides a further illustration of the inventory management system 210. In particular, the inventory management system 210 may implement an adaptive capacity control tool 310 and an ordering model tool 320. The two tools can be used separately and/or in conjunction. Generally, the inventory management system 210 may allow a service provider to consider constraints, including capacity and/or supplier constraints, over a time horizon to optimize uses of available capacity and to generate purchase decisions for particular time periods. This may allow the service provider to balance what, when, and/or how many units of items should be purchased and inventoried.

In an embodiment, the adaptive capacity control tool 310 may be configured to provide data related to best uses of an inventory space given various constraints over a time horizon. This data can be expressed as an opportunity cost. An opportunity cost may indicate a cost associated with a capacity, such as a cost for receiving and storing the item in the inventory 120. For example, the opportunity cost may represent an incremental value, economic or otherwise, that can be obtained by incrementing a capacity constraint (or a supplier constraint) by one unit.

More particularly, the adaptive capacity control tool 310 may access (e.g., receive from computing devices or services of associated users or retrieve from storage) constraints associated with a time horizon. The constraints can include capacity and/or supplier constraints and can be associated with an item category (e.g., specific to items belonging to a same category). The time horizon may include a plurality of time periods. For example, the time horizon may span fifteen weeks and include a busy holiday period. The adaptive capacity control tool 310 may generate an opportunity cost based on the constraints.

In an embodiment, the adaptive capacity control tool 310 can simulate and/or interface with the ordering model tool 320 to simulate supply and demand. The interface with the ordering model tool 320 is illustrated in FIG. 3 as an outer loop 330. The simulation may use an initialized opportunity cost, such as default values, zeroed values, or values derived from a previous time horizon. Based on the simulation, a consumption of capacity associated with inventorying items may be determined, If a discrepancy exists between the consumption and a constraint, the adaptive capacity control tool. 310 may adjust the opportunity cost. The adjusted opportunity cost can be used in re-simulating the supply-demand and estimating the consumption. The simulation and adjustment can be iteratively repeated until a convergence criterion can be met. The convergence criterion can include, for example, a predefined number of iterations and/or a range of an acceptable discrepancy. Once converged, the adaptive capacity control tool 310 may output the opportunity cost. FIGS. 4, 6, 7, and 9 illustrate further examples of the operations of the adaptive capacity control tool 300.

To illustrate, consider an example of inventorying televisions. Over a fifteen-week period, receipt capacity may fluctuate between one hundred to five hundred hours per week. Similarly, the storage capacity may fluctuate between ten thousand and fifty thousand cubic feet. To determine an opportunity cost associated with inventorying televisions over the fifteen weeks, the adaptive capacity control 310 may initialize that cost to zero for each week of the fifteen weeks. Subsequently, the simulation may indicate a need for three hundred hours of receipt capacity in the second week, when only two hundred hours may be available, Similarly, the consumption may indicate a need tier sixty thousand cubic foot storage in the second week. Accordingly, there can be a discrepancy between the available capacity in the second week and the potential capacity consumption.

To mitigate this discrepancy, the adaptive capacity control 310 can increase the opportunity cost in the second week to a certain value, and similarly in other weeks. The supply-demand can be re-simulated using the updated opportunity cost as an input. As a result, the adaptive capacity control tool 310 may determine that the updated opportunity cost can represent a value for optimizing the use of the available capacities in the second and other weeks. For example, at that value, the capacity in the second week may be best used and may account for the capacities of the other weeks.

As further described, this value can be used by the ordering model tool 320 as one of the parameters to determine how many units of an item(s) should be purchased and inventoried. For example, the opportunity cost of the second week can be set to $1 per cubic foot or some other economic value. The ordering model tool 320 may use that value, in addition to other economic values (e.g., potential profit of $2 per item and other values) to simulate the supply and demand and determine the optimum number of units to purchase given the various values.

Further, the opportunity cost can be used as one parameter to compare items or categories of items, For example, if an opportunity cost of one category of items is very different from an opportunity cost of another category of items, that difference can provide multiple inventory-related indications. As one example, the difference may indicate that, given particular capacity constraints, storing one category of items may be associated with a lower cost than another category.

As another example, the difference may indicate that certain capacity assumptions may be inaccurate. For instance, if the two categories are similar with respect to sizes of the items and potential economic values (e.g., women's dress watches and wrist jewelry), the associated opportunity costs can be similar. Thus, in this example, the difference may indicate an incorrectly imposed capacity constraint, As such, users (e.g., operators of the inventory 120) can compare opportunity costs of similar item categories and can determine, as applicable, adjustments to provided capacity constraints. This comparison can be implemented as service within the inventory management system 210 (e.g., at the adaptive capacity control tool 310).

In an embodiment, the ordering model tool 320 may be configured to provide data related to purchase decisions. This data may represent, for example, a number of units of a particular item that should be purchased and inventoried within a particular time period of a time horizon. The data may also represent a plan for purchasing and inventorying additional units of the item within remaining periods of the time horizon.

In particular and for a particular time period (e.g., the immediate next week), the ordering model tool 320 may consider constraints (e.g., capacity and/or supplier constraints) related to that time period and to the other remaining time periods for the time horizon (e.g., a total of fifteen weeks) to generate a purchase decision applicable to the particular time period.

This purchase decision may balance the constraints by, for example, accounting and providing for early and late purchasing decisions, Some of the constraints (e.g., the capacity constraints, the supplier constraints, or both) may be expressed and inputted as opportunity costs.

In addition to the constraints, the ordering model tool 320 may consider a number of other parameters to generate a purchase decision as further illustrated in FIGS. 5, 6, 8, and 9. Briefly, the ordering model tool 320 may use these different parameters to simulate supply and demand. The simulation may involve multiple iterations that can vary the different parameters to find a solution. FIG. 3 illustrates such iterations with an inner loop 340. An inner loop may represent an item-level processing to find an optimal solution for the item. Based on the simulation, the ordering model tool 320 may determine, for example, optimum stocking levels for an item over the time horizon. For example, the ordering model tool 320 may consider various potential stocking levels and determine the level that can maximize certain parameters (e.g., capacity) and minimize others (e.g., cost). As previously described, the ordering model tool 320 may interface with the adaptive capacity tool 310 through the outer loop 330. By using the outer loop 330, the ordering model tool 320 may generate purchase decision that can reduce, minimize, or avoid the under-use or overuse of the constraints.

Further, the outer loop 330 in conjunction with the inner loop 340 may allow constraints defined at an item category level to be used in generating item level purchase decisions. For example, the adaptive capacity control tool 310 may access capacity constraints related to item categories and generate associated opportunity costs. In turn, the ordering model tool 320 may use an opportunity cost associated with an item category to generate purchase decision(s) for an item(s) of the item category. As such, it may be sufficient to define constraints at item category levels, thereby reducing the effort for defining the constraints (e.g., either by operators of the inventory 120, suppliers, or through a process for analyzing historical data). Further, the outer loop 330 may bring cross-item awareness into the inner loop 340 purchasing decision. In other words, because the ordering model tool 320 may use an opportunity cost associated with a category of items, a purchase decision for a particular item of the category may also account for some parameters, such as opportunity costs or some other constraint values, related to other items in that item category. This can improve the overall use of the available capacities.

To illustrate, consider an example opportunity cost of televisions expressed as $1, or some other value, for a particular week. In deciding to purchase one hundred units of a particular television type, the ordering model tool 320 may have accounted for a $0.25 opportunity cost for that television type and the remaining $0.75 for the other television types. This allocation of the opportunity cost across the different television types may represent an optimum allocation of the capacity for that particular week. In addition, the allocation may also include in the purchase decision of the one hundred units of the particular television type the $0.75 opportunity cost to store the other television types.

Figure 4:
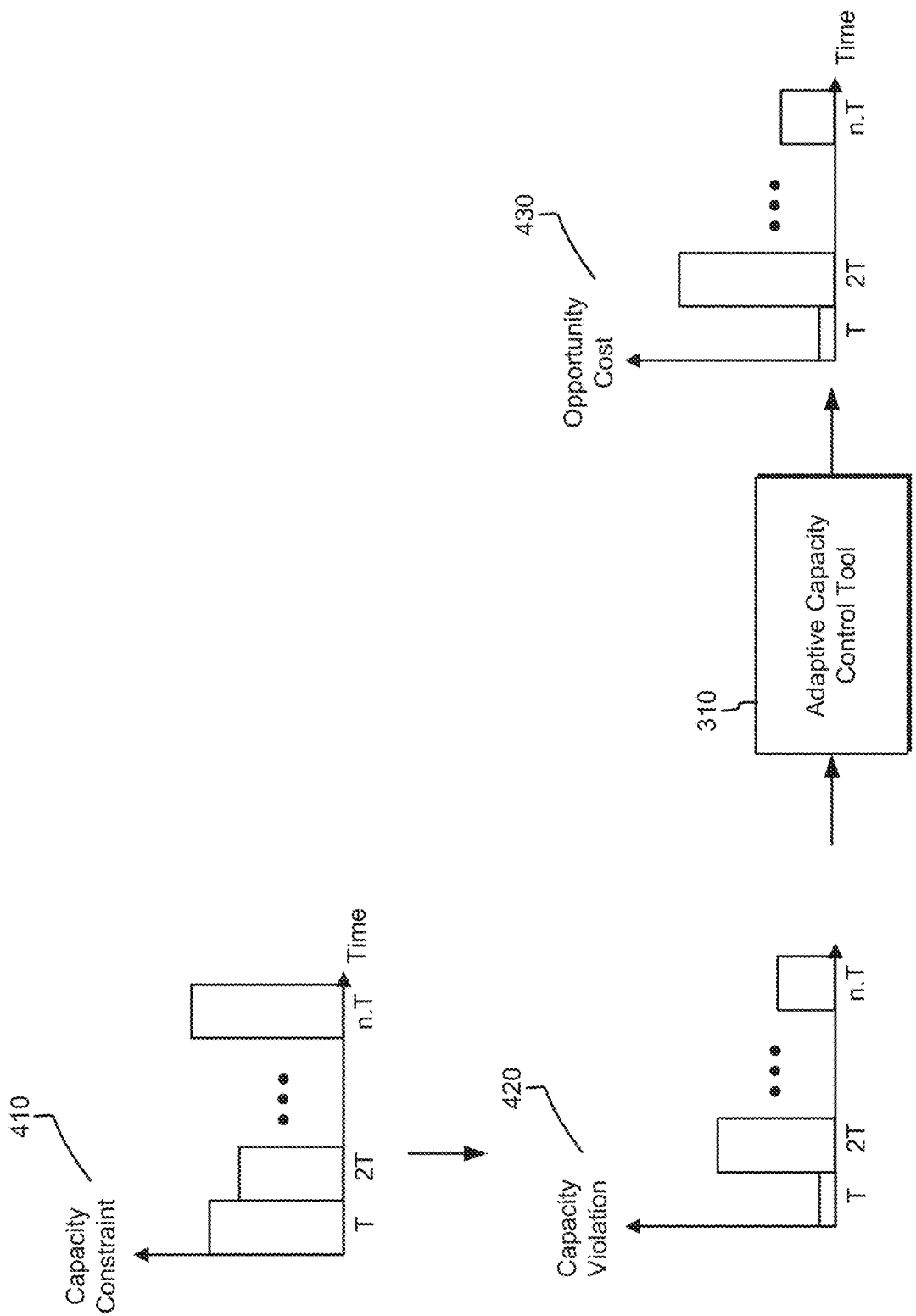
FIG. 4 is a block diagram illustrating an example adaptive capacity control tool configured to determine a value associated with a constraint, according to embodiments.

Turning to FIG. 4, the figure provides a further illustration of the adaptive capacity control tool 310. In particular, a capacity constraint 410 may be inputted to the adaptive capacity control tool 310. In turn, the adaptive capacity control tool 310 may be configured to perform various operations using this input to output an opportunity cost 430 In the interest of clarity of explanation, a capacity constraint is described. Nevertheless, other constraints such as supplier constraints may additionally or alternatively be inputted to the adaptive capacity control tool to similarly generate opportunity costs.

The capacity constraint 410 may include a receipt constraint and a storage constraint associated with inventorying items of an item category in an inventory. For example, the receipt constraint may involve a labor or resource constraint for receiving and preparing such items for storage. The storage constraint may involve a space constraint for storing the items, As illustrated, the capacity constraint 410 can be expressed as a function of time. However, the receipt and storage constraints may be expressed in separate functions or in a single function. Generally, a function can represent a value of the capacity constraint over time. A set of discrete time periods (shown as "T" in FIG. 4), collectively representing a time horizon, may be used. The discrete time periods can have equal or different lengths. For each time period, there may be a particular value for the capacity constraint. As shown in FIG. 4, the capacity constraint 410 can be expressed as a step function. Other discrete or continuous functions may however be used.

Other inputs may also be provided to the adaptive capacity control tool. For example, an identifier of whether an item category includes sortable or non-sortable items can be used. A sortable item can indicate that an automated process may be used to package the item, alone or in combination with other items for delivery. A non-sortable item can be an item for which this automated process may not apply.

To illustrate, consider an example of a fifteen week time horizon. There may be fifteen time periods, each a week long. A value for a receipt constraint can be inputted for every time period. Similarly, a value for a storage capacity can be inputted for every time period. Additionally, an identifier of sortable and non-sortable items may also be used. As such, over the illustrated time horizon, there may be forty-five different inputs to the adaptive capacity control tool 310.

In addition, a capacity violation 420 may be determined based on the capacity constraint 410. In particular, the adaptive capacity control tool 310, or another tool such as the ordering model tool 320, may compare the capacity constraint 410 to a simulated consumption of the capacity. Positive and negative violations can be determined when the comparison indicates that the capacity is over-used or under-used, respectively. Further, the adaptive capacity control tool 310 may output the opportunity cost 430. This cost may represent a value usable by, for example, the ordering model tool 320, to adjust ordering decisions such that the capacity use may be optimized and the capacity violation 420 may be minimized. As illustrated in FIG. 4, the capacity constraint 410, the capacity violation 420, and the opportunity cost 430 need not be proportional. In an example, a non-linear relationship may exist between any or all of the capacity constraint 410, the capacity violation 420, and the opportunity cost 430.

The opportunity cost 430 may be associated with a single or multiple constraints. For example, the adaptive capacity control tool 310 may output an opportunity cost for an item category per constraint type, such as one associated with a receipt constraint and one associated with the capacity constraint. Additionally or alternatively, the opportunity cost may be outputted per sort type. As illustrated in FIG. 4, the opportunity cost may also be expressed as a function time. In particular, the same time horizon and time periods may also be used. In such situations, the opportunity cost 430 can be expressed as a step or some other discrete function. Nonetheless, the opportunity cost 430 is typically not expressed using a same type of function as the capacity constraint 410.

As illustrated in FIG. 4, the higher the capacity constraint 410 may be, the higher the opportunity cost 430 may also be. This can reflect that, for example, when capacity is limited, inventorying items can be costlier. In other words, during time periods where abundant capacity may exist, inventorying an item can be easily completed. Thus, the opportunity cost can be low. In comparison, during time periods when available capacity can be scarce such as during a peak holiday season, every bit of capacity can become important. Thus, the opportunity cost can be higher, reflecting that any misuse of the capacity can be costly.

Figure 6:
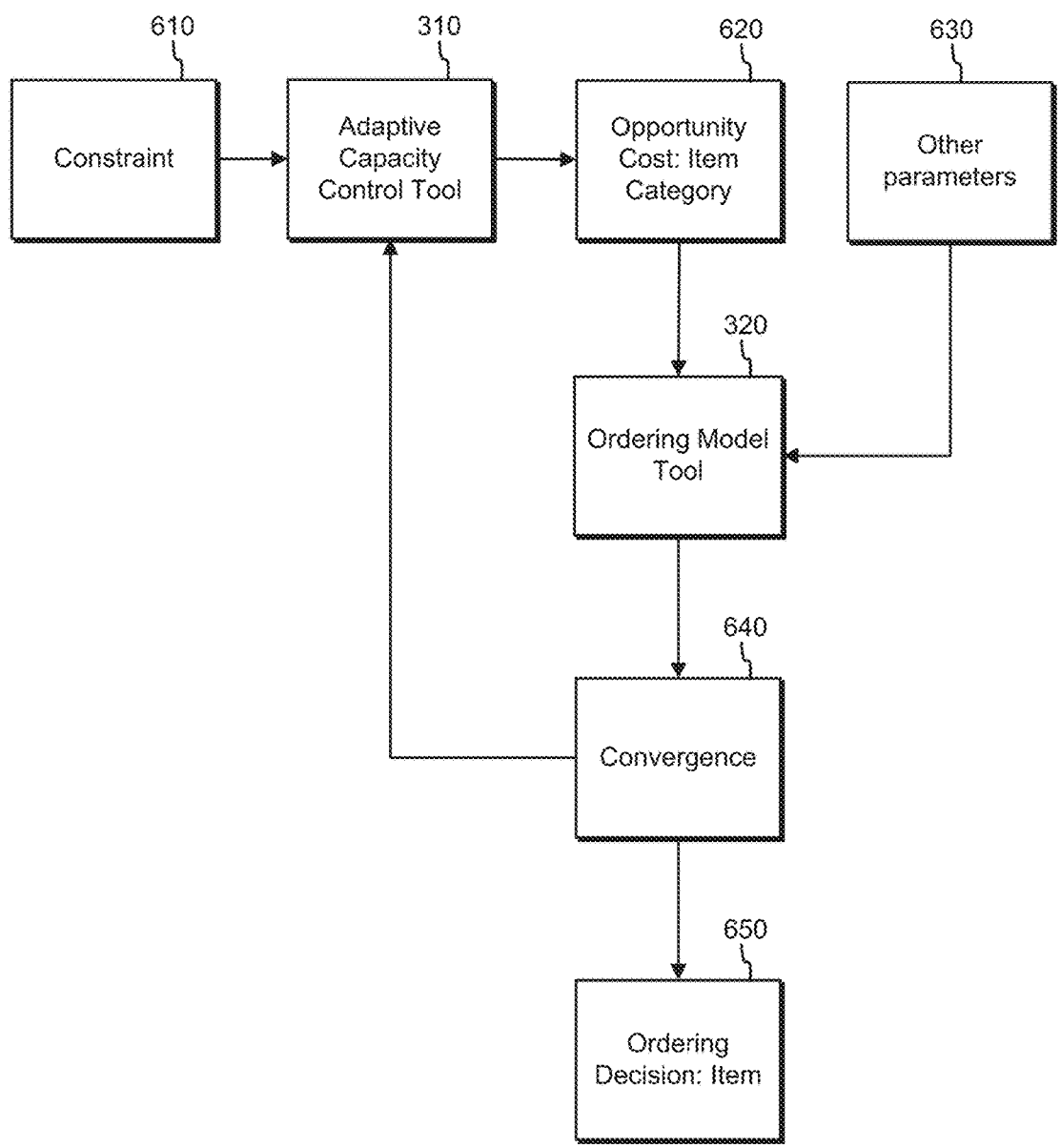
FIG. 6 is a block diagram illustrating an example interface between an adaptive capacity control tool and an ordering model tool, according to embodiments.

To process the capacity constraint 410 and other inputs and to output the opportunity cost 430 over a time horizon, the adaptive capacity control tool 310 may be configured to perform various operations. In particular, the adaptive capacity control tool 310 may simulate or interface with a model or another tool (e.g., the ordering model tool 320) configured to simulate supply and demand over the time horizon. The opportunity cost 430 may be used as one of different parameters in the simulation. The first simulation may use a default set of values for the opportunity cost 430. The simulation may indicate a consumption of the capacity. If the consumption violates the capacity, the adaptive capacity control tool 310 may update the opportunity cost 430 to mitigate the violation. The supply and demand can be re-simulated using the updated opportunity cost 430. This iterative process of simulating the supply and demand and adjusting the opportunity cost 430 can be repeated until a convergence criterion may be met. FIG. 6 illustrates an example convergence criterion.

The adaptive capacity control 310 may provide intelligence around searching for the right adjustments of the opportunity cost 430. This can involve using one or more of iterative optimization algorithms such as a sub-gradient algorithm, a Broyden-Fletcher-Goldfarb-Shanno (BFGS) algorithm, or other algorithms. When the convergence criterion is met, the resulting opportunity cost 430 may represent a set of optimal values that can be used to further generate purchase decisions over the time horizon without violating the capacity constraint 410.

To illustrate, the simulation can simulate multiple scenarios of supply, arrivals, demand, and/or expected purchases from suppliers over the time horizon using different objective functions. An output of the simulation can include a realization of demand and an estimate of how much inventory may be carried in every time period of the time horizon. This can translate into a realized consumption of capacity in every time period.

For each time period, the adaptive capacity control 310 may compare the capacity consumption to the associated capacity constraint. If the capacity is under-used in a particular time period, the adaptive capacity control 310 may decrease the opportunity cost for that time period. Conversely, if the capacity is over-used, the opportunity cost may be increased. The adjustment of the opportunity cost, such as the size and direction of change, can be determined using an iterative optimization algorithm. For example, the adaptive capacity control tool 310 may iteratively call a sub-gradient algorithm to analyze the objective functions used in the simulation. The sub-gradient algorithm may generate a step size and a direction. These can be set as a shadow price. As such, the shadow price may represent a change in an objective function obtained from changing the capacity by a certain number of units. The shadow price can be set as the updated opportunity cost until convergence.

In an illustrative embodiment, the adaptive capacity control tool 310 may use various variables, functions, and algorithms in generating the opportunity costs 420. In particular, let A represent a set of items belong to an item category, T the time horizon including a set of time periods, and T the last time period in the time horizon. The following notations can also be used:

$d_{it}$: Demand for an item i during time period t.
$q_{it}$: Existing outstanding order quantity for item i that will arrive at the end of time period t.
$c_i$: Effective procurement cost of item i per unit.
$p_i$: Effective selling price of item i per unit.
$r_i$: Salvage value of item i at the end of time horizon T per unit.
$v_i$: Storage space required for storing item i per unit.
$a_i^k$: Storage type of item $a_i^k=1$ item i falls into type k, 0 otherwise, where k=1, 2, 3 stands for sortable, non-sortable, and full-case.
$A_i$: Consumer in-stock value, such as long term profit of item I per unit in-stock sale.
$h_i$: Cost of capital per period per unit for item i.
$\tau_i$: Vendor lead time for item i.
$IV_t^k$: Available storage space capacity at the end of time period t for storage type k.
$IA_t^k$: Available receipt capacity at the end of time period t for storage type k.
$IU_t^k$: Allowed number of on-hand inventory units at end of time period t.
$IC_t^k$: Allowed budget for on-hand inventory value at end of period t.
B: Number of lost sales (or backorders) allowed during periods between 0 and T.

The following decision variables can be used.
$TIP_{it}$: Target inventory position of item i at the end of time period t.
$x_{it}$: Quantity of item i ordered at the end of time period t.
$I_{it}^+$: On-hand inventory units of item i at the end of time period t.

$O_{it}$: Outstanding orders for item i at the end of time period t.

With these variables, a capacity control problem can be formulated as:

$$\max \mathbb{E}\left[\sum_{i \in A}\left(\sum_{t \in T}((p_i + \Lambda_i)\min\{I^+_{i,t-1}, d_{it}\} - c_i x_{it} - h_i I^+_{it}) + r(I^+_{iT} + O_{iT})\right)\right] \quad (1)$$

$$I^+_{it} = \max\{I^+_{i,t-1} - d_{it}, 0\} + x_{i,t-\tau_i} + q_{it} \forall i \in A, \forall t \in T \quad (2)$$

$$x_{it} = \max\{TIP_{it} - O_{it} - I^+_{it}, 0\} \forall i \in A, \forall t \in T \quad (3)$$

$$O_{it} = O_{i,t-1}{}^s + x_{i,t-1} - x_{i,t-\tau_i-1} - q_{i,t-1} \forall i \in A, \forall t \in T \quad (4)$$

$$\sum_{i \in A} a_i^k v_i \mathbb{E}[I^+_{it}] \leq IV_t^k \quad \forall t \in T, k = 1, 2, 3 \quad (5)$$

$$\sum_{i \in A} a_i^k (q_{it} + \mathbb{E}[x_{i,t-\tau_i}]) \leq IA_t^k \quad \forall t \in T, k = 1, 2, 3 \quad (6)$$

$$\sum_{i \in A} c_i \mathbb{E}[I^+_{it}] \leq IC_t \quad \forall t \in T \quad (7)$$

$$\sum_{i \in A} \mathbb{E}[I^+_{it}] \leq IU_t \quad \forall t \in T \quad (8)$$

$$\sum_{i \in A} \sum_{t \in T} \mathbb{E}[\min\{d_{it} - I^+_{i,t-1}, 0\}] \leq B \quad (9)$$

The capacity constraints can be at capacity level of an item category. Let $\theta_{tv}^k$, $\theta_{ta}^k$, $\theta_{tc}$, $\theta_{tu}$, and $\lambda$ be Lagrange multipliers corresponding to the constraints on storage space, arrivals, inventory value and units, and lost sales, respectively. Relaxing the constraints (5)-(9) can result in the following model:

$$\max \mathbb{E}\left[\sum_{i \in A}\left(\sum_{t \in T}((p_i + \Lambda_i)\min\{I^+_{i,t-1}, d_{it}\}] - c_i x_{it} - h_i I^+_{it}\right) + \quad (10)$$

$$r_i(I^+_{iT} + O_{iT})\right)\right] - \sum_{t \in T}\sum_{k=1}^{3} \theta_{tv}^k \left(\sum_{i \in A} a_i^k v_i \mathbb{E}[I^+_{it}] - IV_t^k\right) -$$

$$\sum_{t \in T}\sum_{k=1}^{3} \theta_{ta}^k \left(\sum_{i \in A} a_i^k (q_{it} + \mathbb{E}[x_{i,t-\tau_i}]) - IA_t^k\right) -$$

$$\sum_{t \in T} \theta_{tc} \left(\sum_{i \in A} c_i \mathbb{E}[I^+_{it}] - IC_t\right) -$$

$$\sum_{t \in T} \theta_{tu} \left(\sum_{i \in A} \mathbb{E}[I^+_{it}] - IU_t\right) -$$

$$\lambda \sum_{t \in T}\left(\sum_{i \in A} (\mathbb{E}[\min\{d_{it} - I^+_{i,t-1}, 0\}] - B\right)$$

$$I^+_{it} = \max\{I^+_{i,t-1} - d_{it}, 0\} + x_{i,t-\tau_i} + q_{it} \forall i \in A, \forall t \in T \quad (11)$$

$$x_{it} = \max\{TIP_{it} - O_{it} - I^+_{it}, 0\} \forall i \in A, \forall t \in T \quad (12)$$

$$O_{it} = O_{i,t-1}{}^s + x_{i,t-1} - x_{i,t-\tau_i-1} - q_{i,t-1} \forall i \in A, \forall t \in T \quad (13)$$

$$\theta_{tv}^k, \theta_{ta}^k \geq 0 \forall t \in T, k = 1, 2, 3$$

$$\theta_{tc}, \theta_{tu} \geq 0 \forall t \in T$$

$$\lambda \geq 0$$

For a given set of Lagrange multipliers, this problem can be decomposed into sub-problems for each item, resulting in multi-time period single item problems. Since the optimal values of the Lagrange multipliers, which can be used to relax and decompose the multi-item problem, may not be known, there can be two problems to solve. The first one may include a single item problem, which can use the Lagrange multipliers as inputs and find the order up to a level, to optimize the objective function for a particular item without any constraints. The second problem can include the multi-item, multi-time period problem, where the results of the single-item problems can be used as inputs and optimize the objective function (1) subject to the constraints (2)-(9). The former one can be referred to as the inner loop and is further illustrated in FIG. 5. The latter can be referred to as the outer loop. Because inner and outer loops may depend on the output of each other, these loops should be iteratively solved convergence to an optimal solution.

To solve for the outer loop, the inner loop may be used to generate a simulation. For a given set of Lagrange multipliers, the inner loop simulation can be run, the object function and constraints can be evaluated, and the multi-time period problem at an aggregate level can be directly solved.

In an example, the inner loop simulation may use the following Lagrange multipliers. For constraint (5), there can be 8 for k=1, 2, 3, and for the constraints (7)-(9), $\theta_1$, $\theta_2$, and $\lambda$, respectively, can be used. Therefore, if maximizing the objective function (1) can be guaranteed for a single item, then running an inner loop simulation with the multiplier vector ($\theta$, $\lambda$) can be equivalent to solving the problem below:

$$g'(\theta, \lambda) = \max \Sigma_{i \in A} \Sigma_{t \in T}(p_i + \Lambda_i) y_{it}(\theta, \lambda) - \Sigma_{i \in A} \Sigma_{t \in T} c_i x_{it}(\theta, \lambda) + \Sigma_{i \in A} s_i I_{iT}^+(\theta, \lambda) - \Sigma_{i \in A} \Sigma_{t \in T} h_i I_{it}^+(\theta, \lambda) \quad (14)$$

where denotes the expected number of sales. This can reduce the multi-time period capacity control problem to the following one:

$$\max g'(\theta, \lambda) \quad (15)$$

As such, if the assumption that the single-item problem can be solved holds, the optimal solution for the multi-time period problem can be found by searching the optimal Lagrange multipliers through simulation. Different search algorithms can be used as further described herein below.

In an example, the sub-gradient algorithm can be used. The sub-gradient algorithm may allow solving Lagrangian relaxation problems. In this one, gradient can be approximated by sub-gradients and the Hessian function may not be used at all. Various methods can be implemented for finding the step-size to guarantee convergence of the algorithm. An example pseudo-code of the sub-gradient algorithm may include:

1 Begin
2 Given starting point $(\theta,\lambda,\gamma)_o$
3 $k \leftarrow 0$
4 Run simulation with $(\theta,\lambda,\gamma)_o$ and retrieve results;
5 $\bar{g}' \leftarrow g'((\theta, \lambda, \gamma)_o)$
6 $\overline{(\theta,\lambda,\gamma)} \leftarrow (\theta,\lambda,\gamma)_o$
7 While stopping criteria are not satisfied, do
8 Compute step size as $$\alpha_k = \frac{\beta_k [UB - g'^{((\theta,\lambda,\gamma)_k)}]}{\|Ax^k - b\|^2}$$

9 Where $Ax^k - b$ is the constraint matrix and $\beta_k$ is a scalar between 0 and 2;
10 Set $(\theta,\lambda,\gamma)_{k+1} = (\theta,\lambda,\gamma)_k + \alpha_k(Ax^k-b)$;
11 $k \leftarrow k+1$
12 Run simulation with $(\theta,\lambda,\gamma)_k$ and retrieve results;
13 If $\bar{g}' > g'((\theta,\lambda,\gamma)_k)$ then
14 $\bar{g}' \leftarrow g'(\theta,\lambda,\gamma)_k)$
15 $\overline{(\theta,\lambda,\gamma)} \leftarrow (\theta,\lambda,\gamma)_k$ The algorithms implemented in the inner and outer loops can be run iteratively, while updating multipliers until an optimal solution (e.g., a solution that may satisfy a convergence criterion) can be found. This can allow the decoupling of the two loops. As a result, algorithms in each loop can be modified separately for improvements. The iterative search may also allow Lagrange multipliers for the inner loop to he found and updated on a timely basis in an automated manner, improving performance of the inner loop. Further, as the Lagrange multipliers for storage capacity could he interpreted as the value of having additional unit capacity, these values can be used in analysis of improving or designing new inventory facilities.

Figure 5:
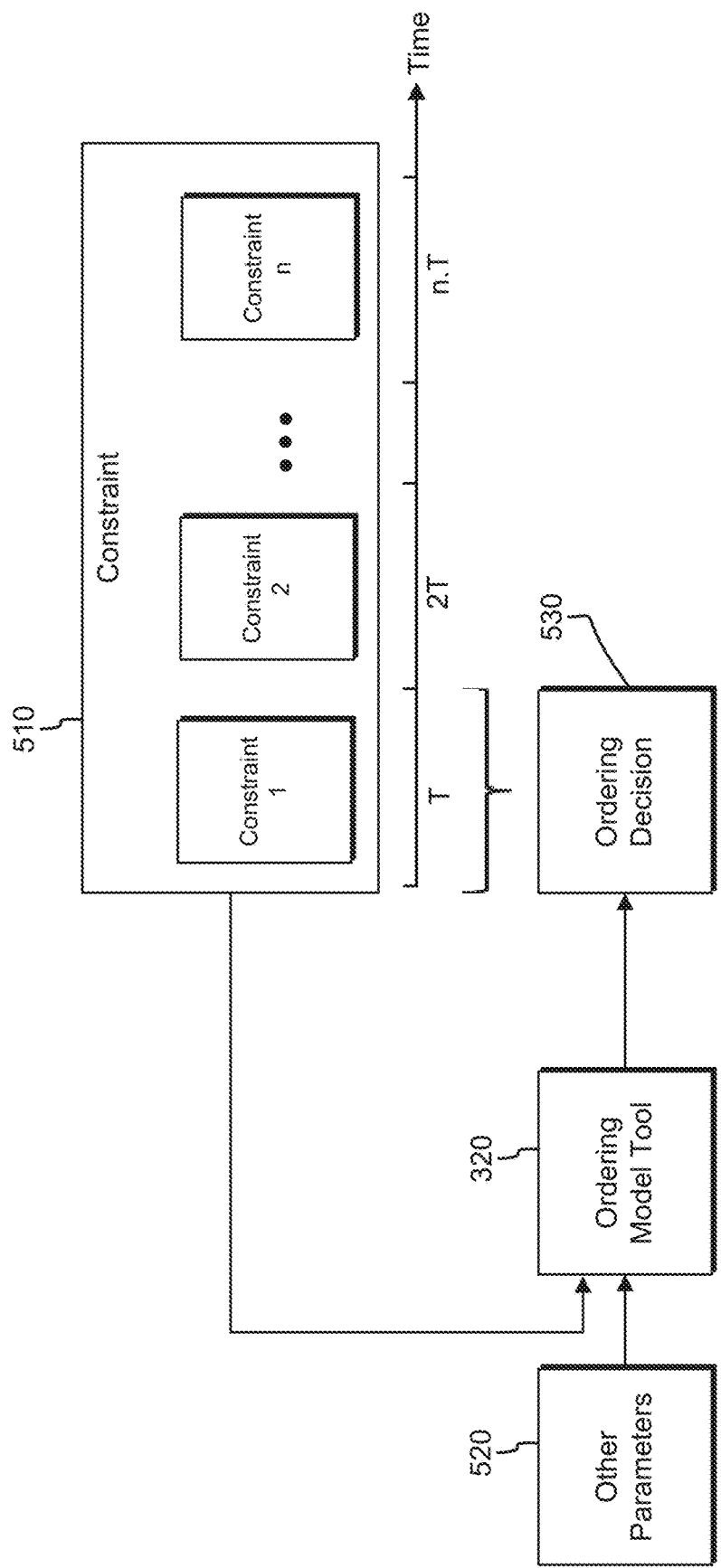
FIG. 5 is a block diagram illustrating an example ordering model tool configured to order units of an item for inventorying, according to embodiments.

Turning to FIG. 5, the figure provides a further illustration of the ordering model tool 320. In particular, parameters associated with a constraint 510 over a time horizon and other parameters 520 may be inputted to the ordering model tool 320. In turn, the ordering model tool 320 may be configured to perform various operations using this input to output an ordering decision 530. In particular, the ordering decision 530 may be associated with a particular time period of the time horizon, such as the immediate next time period. As such, the ordering model tool 320 may consider, among other things, constraints over the entire time horizon, including constraints associated with multiple future time periods, to generate an ordering decision for a particular time period.

Similarly, the ordering model tool 320 may generate ordering plans tier the remaining time periods. For example, if a particular time period is not an immediate next time period, an ordering plan may be generated by, nonetheless, considering the constraints and other applicable parameters over the entire time period. However, unlike an ordering decision of the immediate next time period, the ordering tool 320 may update the ordering plan on a timely basis, thereby turning the ordering plan into an ordering decision when the particular time period becomes the immediate next time period, In the interest of clarity of explanation, a process of generating the ordering decision is described. Nevertheless, a similar process may be used to generate and update the ordering plan.

The constraint 510 may include different types of constraints, such as capacity constraints and supplier constraints. A capacity constraint, whether associated with a receipt or a storage capacity, can be inputted to the ordering model tool 320 as an opportunity cost. Similarly, a supplier constraint may be also inputted as an opportunity cost. However, other type of parameters can be used. For example, the supplier constraint may be expressed and inputted as a constraint function as further described herein below.

More particularly, the ordering model tool 320 may derive the supplier constraint or may interface with a computing service configured to derive the supplier constraint. The associated process may include analyzing historical data related to past supplier performances to estimate a future supplier constraint. To improve reliability, estimating a supplier constraint for a particular time period may consider past performances across multiple time periods. For example, to estimate a supplier constraint for the month of December in a current year, performances related to the month of December in the past year and other proximate month(s) (e.g., November and January) may be used.

In general, a supplier constraint may quantify a supplier risk concerning the reliability of suppliers. The quantity a supplier may confirm in response to a purchasing order, the time needed for a supplier to deliver, the availability of an item during a peak time period, and other relevant issues can fall into the concern of supplier risk. Accordingly, a supplier constraint can be estimated and may represent a quantity that a service provider may be capable of ordering and acquiring from a supplier before and during a particular time period on a timely basis (e.g., weekly).

A supplier constraint model can be used to estimate the supplier constraint based on the supplier risk. This model can interface or integrate with the ordering model tool 320. Because the ordering model tool 320 can output future-looking ordering decisions or plans, the supplier constraint model can be configured to re-allocate orders close to a peak time period (e.g., a busy holiday season) to earlier buying days. This may prevent a service provider from facing the hazard of not being able to acquire enough items immediately before the peak. Estimating the quantity can be a complicated task, since the service provider may not have direct access to suppliers' inventory information, production schedule, information system, and/or other competitors' ordering strategy.

To circumvent these complexities, the supplier constraint model can derive an estimation of this quantity based on the service provider's ordering/receiving and demand profile from previous time horizon(s) (e.g., the previous year). At an item category, the supplier constraint model can calculate the ratio between receiving quantity per time period (e.g., weekly) and peak demand of the previous time horizon. The supplier constraint model can apply the same ratio to the peak demand forecast of the current time horizon at individual item levels, thus obtaining estimated ordering/receiving quantity for each time period. This estimated quantity can be inputted to the ordering model tool 320 as a constraint on the ordering quantity per time period for all time periods until the demand peak demand time period. In an embodiment, the current buying day can be exempt from the constraint. This may allow the service provider to place a higher order to compensate for any possible insufficiency in a later period. Further, the supplier constraint can be sometime too tight due to noise from effects of various buying policies that the service provider may have used in the previous time horizon. To address this issue, the supplier constraint model can provide the flexibility to scale up or down the supplier constraint by a scalar, so both supplier risk and business requirements can be satisfied simultaneously.

In an illustrative embodiment, the supplier constraint model can be configured to output a supplier constraint per time period and per item. This constraint may represent an ordering quantity constraint that can be denoted as OC(t). The process may involve calculating a ratio between a receiving quantity and a peak demand quantity in a previous time horizon and applying this ratio to an item level forecast in a current time horizon to obtain an ordering quantity constraint. The ordering model tool 320 may then use this constraint to output an ordering decision for a current time period.

More particularly, the supplier constraint model may collect the following data.

D(t): A demand per time period from a previous time horizon (e.g., a weekly demand averaged over five weeks from a previous year); t can denote time in a time period (e.g., t=2013-12-1).

R(t): A just-in-time receiving quantity per time period from a previous time horizon (e.g., a weekly quantity averaged over five weeks of items ordered within three weeks in advance from a previous year).

O(t): An ordering quantity per time period from a previous time horizon (e.g., a weekly quantity averaged over five weeks from a previous year).

Based on this data, the supplier constraint model may perform the following operations.

Find the maximum of demand between a plurality of time periods from a previous horizon (e.g., the last two months of the previous year): $D^* = \max_t D(t)$.

Identify a second planning end time period (e.g., an end week): $SPH\_END = \arg\max_t D(t)$, where t belongs to the plurality of time periods.

Define primitive beta $\beta_p(t)$ over each time period of the previous time horizon (e.g., each week in the previous year): $\beta_p(t) = R(t)/D^*$.

Find item category level offset between an order peak and a receiving peak: $VLT = \min\{3, \arg\max R(t) - \arg\max O(t)\}$. The maximum can be taken over a particular plurality of time periods from the previous time horizon (e.g., the last three months.) The maximum can be capped by a time period multiplier (e.g., 3 weeks), since all the receiving quantity captured by R(t) were ordered within the time period multiplier before.

Define shifted beta $\beta_s(t)$ by: $\beta_s(t) = \beta_p(t+VLT)$.

Define truncated beta $\beta_{tr}(t)$ by constricting the domain of $\beta_s(t)$ to weeks between a start of the particular plurality of time periods and SPH_END.

Define modified beta $\beta_m(t)$ based on $\beta_{tr}(t)$ such it can be a non-incrementing function. A detailed definition can include $t^* = \arg\max\{\beta_{tr}(t)\}$, $\beta^* = \beta_{tr}(t^*)$, $\beta(t) := \beta^*$ for $t \leq t^*$ and $\beta(t) := \min\{\beta(t-1), \beta_{tr}(t)\}$ for $t > t^*$.

Map β values in the previous time horizon to the current time horizon: β for a particular time in the previous time horizon (e.g., Dec. 1, 2013) should be the same as β for the equivalent time in the current time horizon (e.g., Nov. 30, 2014).

For an item i, in order to derive an ordering constraint curve, demand forecast data per time period (e.g., weekly) until the end of the peak may be needed. For example, a mean demand forecast can be collected. Similar to the treatment to the realized demand of the previous time horizon, an average demand forecast for the current time horizon may be taken (e.g., a five week average of the demand forecast for this year). This function can be denoted as $f_i(t)$. Using the $\beta_{(t)}$ derived for the item category that item i may belong to, the supplier capacity constraint can be defined as: $SC_i(t) = \beta(t) \cdot F$, where $F = \max_t f_i(t)$. The maximum can be taken over a next plurality of time periods (e.g., the next 12 weeks).

To input the supplier capacity constraint to the ordering model tool 320, for each buy time frame (e.g., day) before the end of the ordering constraint, there can be two planning horizons: a primary planning horizon (maybe extended) and a secondary planning horizon which can last to the end time period (e.g., week) of the β(t) settings. Order-up-to values (e.g., TIP) together with ordering quantities (OQ) of the two planning horizons can be respectively calculated. The larger of the two can be taken as the ordering quantity.

$$OQ_{PH} = \max\{0, TIP_{PH} - Supply_{PH}\},$$

$$OQ_{SPH} = \max\{0, TIP_{SPH} - Supply_{SPH} - \Sigma_{T_{SPH} > t > BuyDate_1} OC_t\},$$

$$OQ = \max\{OQ_{PH}, OQ_{SPH}\}.$$

As described herein above, this supplier capacity constraint can be inputted to ordering model tool 320 to output the ordering decision 530. The input may also include other constraint-related data, such as opportunity cost of capacity constraints of an inventory. Similarly, the input may include a number of other parameters 520. The ordering model tool 320 can use the different inputs as parameters to simulate supply and demand for an item and, accordingly, generate the ordering decision 530.

The other parameters 520 can include one or more of, for example, profitability of an item, long term value of inventorying an item such as an in-stock value, holding cost, capital cost, loss cost, recovery cost, acquisition cost, profit margin, volume, velocity, and/or other parameters related to an item. The in-stock value may represent a value associated with a long-term benefit resulting from showing the item at a network-based resource as available in-stock. An example of in-stock value is further described in U.S. patent application Ser. No. 14/318,227 filed on Jun. 27, 2014, entitled "Determining the Value of an Item," which is incorporated herein by reference in its entirety.

In turn, the ordering model tool 320 may use the different inputs to generate and compare a target inventory level to a current inventory level. Based on the comparison, the ordering model tool 320 may generate the ordering decision 530. The target inventory level for the item can be estimated through simulation. The simulation can involve simulating different supply scenarios, demand consumptions, uncertainties in the supply and/or demand, lead times, purchase times, and/or other supply-demand variables. This may result in an inventory flow, which can change from one time period to the next with new arrivals, new demand, and inventory fluctuations.

More particularly, the simulation may use an inner loop to consider different inventory levels, simulate the associated supply and demand, and determine a particular inventory level that may optimize some or all of the parameters (e.g., minimize cost, minimize amount of inventories items, reduce supplier risk, maximize profit, and/or other parameters). An objective function representative of supply and demand variables may be used. For example, the objective function may use different probability distributions to account for how many units of the item can be expected to be bought by consumers, the profit made per sale, the in-stock value per sale, average carried inventory and associated cost.

The ordering model tool 320 can search for a target inventory level that may optimize the objective function. This search can be performed across the different inventory levels to come up with the inventory level that may provide an optimum result (e.g., maximize profit). In other words, the inner loop may cause the search to be repeated across the various inventory levels until a convergence criterion may be met, such as whether the objective function may be optimized or improvements to the objective function. Once met, the ordering model tool 320 can compare the corresponding inventory level to a current level and generate the ordering decision 530.

As such, by considering constraints 510 across a time horizon and the different parameters 520, the ordering model tool 320 may generate the ordering decision 530 for what to purchase in a particular time period given constraints across the entire time horizon. In other words, the ordering model tool 320 can take into account future inventory and/or supplier constraints and associated values, economic or otherwise, to determine what to purchase immediately. This can enable early and late purchases such that constraints can be mitigated throughout the entire time horizon. In addition, by considering constraints at an item category level, the ordering model tool 320 may bring cross-item awareness into ordering decision. In other words, a decision to purchase a certain number of units of an item can account for parameters associated with another purchase decision related to another item of the same item category.

In an illustrative embodiment, the ordering model tool 320 may use various variables, functions, and algorithms in generating the ordering decision 530. In particular, the ordering model tool 320 can model the multi-period problem as a single-item and, optionally a single-location (e.g., one inventory facility), inventory system that can implement a periodic review base-stock policy. At the beginning of each time period, a quantity can be ordered, where the quantity can be equal to the difference between an order-up-to level (e.g., TIP or base-stock) and the inventory position, if any, from suppliers. These orders can be received after some (potentially stochastic) lead time. Then, the ordered units due that time period can be received. In each time period, a random demand can be observed. Excess inventory can be carried over to the next time period and incur holding cost. Unfilled demand can be partially backordered (e.g., a demand rate can change depending on if the system is in or out-of-stock). The objective can include maximizing the total profit during a time horizon.

Base-stock policies can be optimal for a range of inventory problems. However, when the unfilled demand is lost, base-stock policies can be sub-optimal. In fact, the structure of lost sales models has not been studied deeply. Lost sales models can be solved optimally using dynamic programming. Dimensionality can be an issue as lead time increases and the state-space to span can become prohibitively large. The algorithm described herein below can still present an approximation for lost sales cases and identify the optimal order-up-to levels assuming that a base-stock policy may be implemented.

Let index $t \in \{1, \ldots, T\}$ denote the time periods, where T is the length of the planning horizon. Consider the following economic parameters.

$\alpha$=0-1 indicator of lost-sales versus backorders (as a continuous parameter, $\alpha$ would correspond to the ratio of out-of-stock conversion rate to in-stock conversion rate).

p=Selling price of the item ($/unit)
c=Purchasing cost of the item ($/unit)
h=Holding cost for unsold items ($/unit/period)
$\lambda_1$=Penalty for backorders ($/unit/period)
$\lambda_2$=Penalty for lost sales ($/unit)
$u_t^1$=Penalty for storage capacity violation in period t. This can be provided as an output of the adaptive capacity control tool 310 and can be converted to ($/unit)
$u_t^2$=Penalty for inbound receipt capacity violation in period t. This can be provided as an output of the adaptive capacity control tool 310 and can be converted to ($/unit).

The inventory flow can be represented using the following notation in the equations (16a-16d) herein below.
$I_t$=Lead time for the order in period t.
$d_t$=Demand in period t.
$w_t$=Inventory position at the beginning of period t, before the order for period t is input.
$x_t$=Inventory level at the beginning of period t, after the orders due t are received (e.g., available for consumption in t).
$y_t$=Order-up-to level (e.g., base-stock, TIP) at period t
$q_t$=Order placed in period t.
$z_t$=Orders to be received in period t.

The major difference between constant and stochastic lead times can be that, each order may not be associated with a future receipt in a one-to-one manner (e.g., $q_t=z_{t+L}$) if lead times were stochastic, because in a particular period, orders from multiple earlier periods can be received. This may complicate the notation significantly, but may not alter the essence of the model and the solution method. For brevity, consider the simpler case of constant lead times ($I_t$=L for each t). The extension to stochastic lead times is further described herein below. Let $(.)^+ = \max\{0, .\}$ so that on-hand inventory level can be denoted as $(x_t)^{30}$ and backorders as $(-x^t)^+$. Inventory position $w_t$ can be equal to the sum of inventory level $x_t$ and the orders $q_{i-L}=z_i$ that may be received in the coming periods (e.g., i=t+1, . . . , t+L). An order of $q_t=z_{t+L}=y_t-w_t$, units can be placed if the order-up-to level $y_t$ is higher than the inventory position $w_t$. Beginning inventory level in the next period is the current inventory level $x_t$, minus the period's sales (which can be demand $d_t$ less the lost sales $(1-\alpha)(d_t-(x_t)^+)^+$), if any; and the receipt $z_{t+1}$, which can be due at period t+1.

$$w_t = x_t + \Sigma_{i=t-L+1}^{t-1} q_i \quad (16a)$$

$$q_t = (y_t - w_t)^+ \quad (16b)$$

$$z_t = q_{t-L} \quad (16c)$$

$$x_{t+1} = x_t - d_t + (1+\alpha)(d_t - (x_t)^+)^+ + z_{t+1} \quad (16d)$$

Finally, two functions can be defined the optimal value function and the objective function.
$v_t(.)$=Maximum profit through $\{t, \ldots, T\}$ given the inventory setting "." at time t.
$f_t(y_t, .)$=Profit through $\{t, \ldots, T\}$ given the inventory setting "." when the order-up-to level is $y_t$ and all subsequent decisions in $\{t+1, \ldots, T\}$ are optimal. Note that $v_t(.) = \max_{y_t} f_t(y_t, .)$.

The value function i can satisfy the following recursion:

$$v_t(x_t, q_{t-L+1}, \ldots, q_{t-1}) = \max_{y_t \geq w_t} \{-c(y_t - w_t) \quad (17a)$$

$$+ p\mathbf{E}[\min\{(x_t)^+, d_t\}] + p\alpha \mathbf{E}[(d_t - (x_t)^+)^+] \quad (17b)$$

$$- h\mathbf{E}[(x_t - d_t)^+] \quad (17c)$$

$$- \lambda_1 \alpha \mathbf{E}[(d_t - (x_t)^+)^+] \quad (17d)$$

$$-\lambda_2(1-\alpha)\,\mathbb{E}\,[(d_t-(x_t)^+)^+] \qquad (17e)$$

$$-u_t^1 x_t \qquad (17f)$$

$$-u_t^2 z_t \qquad (17g)$$

$$+\mathbb{E}\,[v_{t+1}(x_{t+1},\,q_{t-L+2},\,\ldots,\,q_t)]\}. \qquad (17h)$$

w, x, q, and z can be used in the expressions for brevity of notation. x, q, and z can be otherwise retrievable through equations (16d-16b). The optimal value function can include the purchasing cost (17a), revenue from sales (17b), inventory holding cost (17c), penalty for backorders (17d), penalty from lost sales (17e), and the optimal profit from subsequent periods (17h). in addition, the arrivals (17g) and the beginning inventory level (17f) in a particular period can be penalized, if the adaptive capacity control tool 310 reports some foreseen capacity violation and communicates positive parameters.

Similarly, the objective function can satisfy the following recursion:

$$f_t(y_t,\,x_t,\,q_{t-L+1},\,\ldots,\,q_{t-1})=-c(y_t-w_t)$$

$$+p\,\mathbb{E}\,[\min\{(x_t)^+,\,d_t\}]+p\alpha\,\mathbb{E}\,[(d_t-(x_t)^+]$$

$$-h\,\mathbb{E}\,[(x_t-d_t)^+]$$

$$-\lambda_1\alpha\,\mathbb{E}\,[(d_t-(x_t)^+)^+]$$

$$-\lambda_2(1-\alpha)\,\mathbb{E}\,[(d_t-(x_t)^+)^+]$$

$$-u_t^1 x_t$$

$$-u_t^2 z_t$$

$$+\mathbb{E}\,[v_{t+1}(x_{t+1},\,q_{t-L+2},\,\ldots,\,y_t-w_t)] \qquad (18)$$

Note that, in $f_t$ there can be no positivity restriction on the order size. This can be a simple trick that may allow solutions where $y_t<w_t$. Let $y_t^*$ denote the optimal solution of $f_t$. If the optimal solution $y_t^*<w_t$, then no buy in period t should be performed. Note that $y_t^*$ can be implied in $v_t$. f and v can be related in the following expression, $$v_t(\cdot)=\begin{cases}f_t(w_t,\,\cdot),\;\text{if }y_t^*<w_t\\ f_t(y_t^*,\,\cdot),\;\text{if }y_t^*\geq w_t\end{cases}. \qquad (19)$$

To solve the problem, stochastic approximation may be used. Briefly, initial estimates for order-up-to levels $(y_1,\,\ldots,\,y_T)$ may be used. A stream of random variates for demand $(d_1,\,\ldots,\,d_T)$ and lead times $(l_1,\,\ldots,\,l_T)$ may be generated. A stochastic gradient of the objective function using the generated random variates can be calculated. A step in the gradient direction can be taken and the estimate for y can be updated. This process can be repeated until the estimates converge.

Further, let index k denote an index that keeps track of the iterations and n the index for scenarios. For the functions, let symbol "^" denote the value evaluated for particular realizations of the random variables (e.g., a path of demand and lead time). For instance, $\hat{f}_t$ can be the objective function for a given set of random variates, $\nabla^n\hat{f}_t$ can be the stochastic gradient obtained using scenario n. The following notations can be used.

k=Iteration number.
$\sigma_k$=Step size at kth iteration.
$\nabla_i$=Partial derivative with respect to variable i.
$\nabla^n\hat{v}_t$=Stochastic gradient of the value function.
$\nabla^n\hat{f}_t$=Stochastic gradient of the objective function.
M=Number of total scenarios generated (default: unlimited).
N=Number of path to sample at each iteration (default: n=1).
$L_{max}$=Additional number of periods to account for trailing demand after T.

The crux of the method can include evaluating a stochastic gradient at each iteration using the realizations of the random variables at that iteration and taking an ascending step towards the gradient direction. First, revisit the definitions in (17) and (18). Expression $1_{(\cdot)}$ can be the common indicator function, which can be 1 if the condition "." is satisfied, and 0 otherwise. Using equalities (19) and (18), the partial derivative of $f_t$ with respect to $y_t$ can be given in equation (20) and the first-order optimality condition can be expressed in equation (21).

$$\frac{\partial f_t}{\partial y_t}(y_t,\,\cdot)=-c+\mathbb{E}\left[\frac{\partial v_{t+1}}{\partial q_t}(\cdot)\right] \qquad (20)$$

$$\Rightarrow \mathbb{E}\left[\frac{\partial v_{t+1}}{\partial q_t}(\cdot,\,q_t^*)\right]=c. \qquad (21)$$

The interpretation of the expression can be simple. An increase in the order-up-to level $y_t$ can cause an immediate unit cost c due to the additional buying and the effect on future value function. If considered from a marginal benefit point of view, at optimality the future value should be equal to the immediate cost incurred. This result can be used in the calculation of the partial derivatives of v as subsequent periods t+1 to T can be already optimized.

The partial derivatives of the value function can be recursively derived in equation (22). The first term can tell that if the order $q_{t-i}$ increased, fewer orders should be placed in t; and this can bring an immediate benefit (e.g., cost reduction) of c per unit, The differentiation variable $q_{t-i}$ and the current order quantity $q_t$ (if any) can be open orders, hence, a part of the inventory position at t+1. The value function in the next period can be affected through two function arguments. The first and the third terms in the equation (22) can cancel each other following the logic explained above to obtain the expression in (23).

$$\frac{\partial v_t}{\partial q_{t-i}}(\cdot)=c1_{(y_t^*>w_t)}+\mathbb{E}\left[\frac{\partial v_{t+1}}{\partial q_{t-i}}(.)\right]-1_{(y_t^*>w_t)}\mathbb{E}\left[\frac{\partial v_t+1}{\partial q_t}(\cdot)\right] \qquad (22)$$

$$=\mathbb{E}\left[\frac{\partial v_{t+1}}{\partial q_{t-1}}(.)\right],\,\forall\,i=1,\,\ldots,\,L-2. \qquad (23)$$

The order placed L–1 periods ago can arrive in the next period; hence, that order can become part of the on-hand inventory and can affect the value function.

$$\frac{\partial v_t}{\partial q_{t-L+1}}(\cdot)=c1_{(y_t^*>w_t)}+\mathbb{E}\left[\frac{\partial v_{t+1}}{\partial x_{t+i}}(.)\right]-u_{t+1}^2+1_{(y_t^*>w_t)}\mathbb{E}\left[\frac{\partial v_{t+1}}{\partial q_t}(\cdot)\right]= \qquad (24)$$

$$\mathbb{E}\left[\frac{\partial v_{t+1}}{\partial x_{t+1}}(.)\right]-u_t^2+1$$

Combining the results in equations (23) and (24), the following expression can be derived:

$$\frac{\partial v_t}{\partial q_{t-1}}(\cdot) = \qquad (25)$$

$$\mathbb{E}\left[\frac{\partial v_{t+1}}{\partial q_{t-1}}(\cdot)\right] = \ldots = \mathbb{E}\left[\frac{\partial v_{t+L-2}}{\partial q_{t-1}}(\cdot)\right] = \mathbb{E}\left[\frac{\partial v_{t+L-1}}{\partial x_{t+L-1}}(\cdot)\right] - u_{t+L-1}^2$$

Finally, the partial derivative with respect to the on-hand inventory available for fulfillment can be expressed as in equation (26). The first line of this expression can correspond to the immediate benefit due to ordering less. The second line can be the cost of underage and overage terms, respectively. If the ending inventory level for the period is positive, the change in value function can be carried to the future periods as shown in the third line. The last line can be the future value change caused by the reduction in order quantity.

$$\frac{\partial v_t}{\partial x_t}(\cdot) = c1_{(y_t^* > w_t)} - u_t^1 + [\alpha\lambda_1 + (1-\alpha)(p+\lambda_2)]\mathbb{P}\{d_t > x_t\} - \qquad (26)$$

$$h\mathbb{P}\{d_t \leq x_t\} + [1 - (1-\alpha)\mathbb{P}\{d_t > x_t\}]\mathbb{E}\left[\frac{\partial v_{t+1}}{\partial x_{t+1}}(\cdot)\right] -$$

$$1_{(y_t^* - w_t)}\mathbb{E}\left[\frac{\partial v_{t+1}}{\partial q_t}(\cdot)\right].$$

The first and last lines can cancel when the first order condition in equation (21) is applied. The following expression can result:

$$\frac{\partial v_t}{\partial x_t}(\cdot) = \beta_t - \eta_t + \xi_t \mathbb{E}\left[\frac{\partial v_{t+1}}{\partial x_{t+1}}(\cdot)\right], \qquad (27)$$

where $$\beta_t \equiv [-u_t^1 + \alpha\lambda_1 + (1-\alpha)(p+\lambda_2)]\mathbb{P}\{d_t > x_t\},$$

$$\eta_t \equiv [u_t^1 + h]\mathbb{P}\{d_t \leq x_t\}$$

$$\xi_t \equiv 1 - (1-\alpha)\mathbb{P}\{d_t > x_t\}$$

Returning back to the derivative of the objective function in (20), and combining with the result from (27), the partial derivative of the objective function with respect to y can be obtained as:

$$\frac{\partial f_t}{\partial y_t}(y_t, \cdot) = -c + \mathbb{E}\left[\frac{\partial v_{t+1}}{\partial q_t}(\cdot)\right] = -c + \mathbb{E}\left[\frac{\partial v_{t+L}}{\partial x_{t+L}}(\cdot)\right] - \mathcal{U}_{t+L}^2, \qquad (28)$$

Once a scenario n sampling a demand path $d^n = \{d_1^n, \ldots, d_T^n\}$ is generated, the associated stochastic gradient can be obtained as:

$$\nabla_{y_t}\hat{f}_t(y_t, \cdot, d^n) = -c\nabla_{x_{t+L}}\hat{v}_{t+L}(\cdot, d^n) - v_{t+L}^2 \qquad (29)$$

$$\nabla_{x_t}\hat{v}_t(\cdot, d^n) = \hat{\beta}_t^n - \hat{\eta}_t^n + \hat{\xi}_t^n \nabla_{x_{t+1}}\hat{v}_{t+1}(\cdot, d^n); \qquad (30)$$

where the stochastic gradient counterparts of the terms $\beta$, $\eta$, and $\xi$ can be $$\hat{\beta}_t^n = [-\mu_t^1 + \alpha\lambda_1 + (1-\alpha)(p+\lambda_2)]\Pi_{d_t^n > x_t^n},$$

$$\hat{\eta}_t^n = [\mu_t^1 + h]\Pi(d_t^n \leq x_t^n),$$

$$\hat{\xi}_t^n \equiv 1 - (1-\alpha)\Pi(d_t^n > x_t^n).$$

Simplifications from equations (27, 28) can allow keeping track of only the particular partial derivatives $\nabla_{x_t}v_t$, and $\nabla_{x_{y_t}}vf_t$ instead of the entire gradients. Using these partial derivatives, the following algorithm can be implemented to solve the multi-period buying problem.

There are two different set of variables—the variables at the beginning of the time horizon and the terminating conditions at the end of the time horizon, such as t=T+1. The former initialization may not be difficult as the system may already have the necessary data for placed orders and existing inventory. In case supply information may not be available or considered, the optimal solution would target the demand in $[l_t, l_{t+1}]$ resulting in a smaller TIP. In this case, an approximation can consider $l_1 = 0$ and allow instant replenishment for the first purchase.

The terminating condition can be set such that the unsold inventory at the end of T can be sold at a value between 0 and c (after incurring a holding cost). One thing to be careful about may include not setting a value higher than c+h, which can create an arbitrage opportunity. The pseudo-code of this algorithm can be as following input: Economic parameters, demand, lead-time, inventory snapshot
output: Optimal order-up-to levels for the next T periods
set terminating thresholds $K_{min}$, $K_{max}$, and $\epsilon$;
initialize k=0, $\sigma_0$, $y_t$, $x_1$, and z, hence $w_1 = x^1 + \Sigma_{i=1}^{L-1} z_{1+i}$;
initialize end of horizon values ;
// generate M scenarios
for n=1 to M do
    generate customer demand: $d_1^n, \ldots, d_T^n$;
    generate supplier lead time: $l_1^n, \ldots, l_T^n$;
// calculate inventory targets
repeat
    k=k+1;
    set z to initialized values;
    retrieve current subset of N scenarios;
    // calculate inventory flow: forward
    for n=1 to N do
        for t=1 to $T+L^{max}$ do
            order quantity: $z_{t+l_t^n}^n = z_{t+l_t^n}^n + (y_t^n - w_t^n)^+$;
            arrivals: $x_t^n = x_t^n + z_t^n$;
            sales: $d_t^n - (1-\alpha)(d_t^n - (x_t^n)^+)^+$;
            ending inventory level: $x_{t+1}^n = x_t^n -$sales;
            ending inventory position: $\max\{y_t^n, w_t^n\} -$sales;
            underage cost: $\hat{\beta}_t^n = [-u_t^1 + \alpha\lambda_1 + (1-\alpha)(p+\lambda_2)]\Pi_{(d_t^n > x_t^n)}$;
            overage cost: $\hat{\eta}_t^n = [u_t^1 + h]\Pi_{(d_t^n \leq x_t^n)}$;
            carryover: $\hat{\xi}_t^n = 1 - (1-\alpha)\Pi_{(d_t^n > x_t^n)}$;
        end
    end
    // calculate stochastic gradients of value function: backward
    for n=1 to N do
        for $t=T+L^{max}$ down to 1 do
            value function: $\nabla_{x_t}v_t = \hat{\beta}_t - \hat{\eta}_t + \hat{\xi}_t \nabla_{x_{t+1}}\hat{v}_{t+1}$;
        end
    end
    // calculate stochastic gradients of objective function: backward
    for t=T down to 1 do
    objective function:

$$\nabla_{y_t}\hat{f}_t = -c + \frac{1}{N}\left[\sum_n \left(\nabla_{x_{t+l_t^n}}\hat{v}_{t+l_t^n} - u_{t+l_t^n}^2\right)\right];$$

end
// update solution
order-up-to levels: y=y+σ_k[∇_{y_1}f̂_1 ... ∇_{y_T}f̂_T];
// update step size
update step size;
until k>K_{min} and k>K_{max}

Initial estimates can come from various sources. When this problem is solved at different times, the last solution vector (e.g., from last week) can be used to initialize the algorithm. Another method can involve using a single period approximation as the initial estimate, which can provide potentially close to the optimal values.

Determining step sizes can be the nadir of this method. A couple of different step size updating procedures can be used. Ideally, to solve a deterministic problem (e.g., work on the expected profit function directly), a line search along the gradient direction can be made, the result of which would give the step size. In the stochastic case, a sequence of step-sizes can be set either deterministically (e.g., a fixed sequence based on current iteration number) or stochastically (e.g., considering the error of the estimate in the current estimate).

Consider a problem where the lead-time is three weeks and there is no initial inventory or on-order units. Weekly demand can be distributed according to a gamma distribution with mean 20 and standard deviation 6. All $y_t$ can be initially set to 80 (e.g., μ×(L+1)). Only the scenario where the unfilled demand is fully backlogged can be reported. As mentioned earlier, under this scenario, the base-stock policy can be optimal and can be calculated easily. The optimal solution to this problem (given the used economic parameters) can be 92.35 units.

The harmonic step-size rule can have the following form. The choice of a and b can determine how fast the step-size approaches 0, hence the choice can allow searching before converging. Incrementing a and b can delay convergence, which can be for a=b=1. The increase in the number of paths clearly can make the oscillations smaller and convergence faster. The harmonic rule can be the optimal step-size rule, but not always be the most practical.

$$\sigma_k = \frac{a}{b+k}$$

The McClain's step-size rule can be another deterministic rule, which can be determined by the target constant step-size it approaches. The choice of the target can determine the speed of convergence. When the target is large, the optimal solution can wander around. Although this may seem undesirable, for cases where there can be many random factors such step-sizes, the solution can work well avoiding premature convergence. Also, when the number of samples increases, the step-sizes can tighten the optimal solution.

$$\sigma_k = \frac{\sigma_{k-1}}{1 + \sigma_{k-1} - \text{target}}$$

Two or more stochastic step-size rules can be used. Kesten's step-size rule can be one of them. This rule can be based on the following idea. Around optimal solution, the derivative (e.g., error) can change sign more frequently. Hence, the method can decrease the step-size as the signs of the consecutive errors change.

$$\sigma_k = \frac{a}{a + M_k - 1}$$

$$M_k = \begin{cases} k & \text{if } k = 1, 2 \\ M_{k-1} + \mathbb{1}_{(\in_k \in_{k-1} < 0)} & \text{if } k > 2 \end{cases}$$

$\in_k = \nabla_{y_1}$ at $kth$ iteration

The bias-adjusted Kalman filter step-size rule (BAKF) can be another stochastic rule, This rule can consider the error, the error bias, and variance in adjusting the step-sizes. The Parameter a can be the same as in harmonic step-size rule.

There may not be an overall decision rule to pick a step-size update method. For stationary data, the harmonic rule (e.g., sample average) can be the optimal method (e.g., minimizing the deviation between predicted and the actual observation obtained after that). For non-stationary data, BAKF can be the optimal method. However, these can be theoretical properties, and in practice, especially when there may be various sources of uncertainty (e.g., lead-time, demand, price), methods like McClain's formula that do not necessarily go to zero can work well, harmonic rule can be implemented after some preset number of iterations. In fact, there can be some methods, which first search with a method and seek convergence with another method.

Algorithm (or stochastic approximation algorithms in general) can converge with some conditions on the step-sizes such as "non-negativity," "sum going to infinity," and "expected sum of squares being finite." Some step-size rules are not proven to converge (e.g., BAKF).

The problem and the solution method above are described within the context of a constant lead time setting. Stochastic lead time can be a general case that may contain both the constant and the variable lead time cases. This extension assumes that the lead times and the demand are independent of each other. Herein next, changes required for the stochastic lead time extension are indicated. In stochastic lead time, the inventory position at t can include the inventory level $x_t$ and all past orders $q_i$ that may have not yet been received at the time of the decision. This is shown in equation (31a). Equation (31c) indicates that the inventory received in t is the sum of the previous orders in t'<t, whose (realized) lead time were t-t'. Beginning inventory level can have the same form as the constant lead time case.

$$w_t = x_t + \Sigma_{t'<t} 1_{(l_{t'}>t-t')} q_{t'} \quad (31a)$$

$$q_t = (y_t - w_t)^+, \quad (31b)$$

$$z_t = \Sigma_{t'<t} 1_{(l_{t'}=t-t')} q_{t'}, \quad (31c)$$

$$x_{t+1} = x_t - d_t + (1-\alpha)(d_t - x_t)^+ + z_{t+1}. \quad (31d)$$

The optimal value function and the objective function should consider more previous orders than the constant lead time case as equation (31a) described. Since inventory position can be the threshold for ordering, the objective and value functions can be altered to consider all previous orders. At the time of the decision some of these orders may be redundant, as some of them may have already been received.

The noticeable changes in the objective function and the value function can be that the capacity related penalties on arrivals and the beginning inventory level can be represented as expectations due to their randomness. Equations (32d-32e) combine in the system as the customer in-stock value may be equal between two cases. The optimal value function v can satisfy the following recursion:

$$v_t(x_t, q_1, \ldots, q_{t-1}) = \max_{y_t \geq w_t} \{-c(y_t - w_t) \tag{32a}$$

$$+p\,\mathbb{E}\,[\min\{(x_t)^+, d_t\}] + p\alpha\,\mathbb{E}\,[(d_t - (x_t)^+)^+] \tag{32b}$$

$$-h\,\mathbb{E}\,[(x_t - d_t)^+] \tag{32c}$$

$$-\lambda_1 \alpha\,\mathbb{E}\,[(d_t - (x_t)^+)^+] \tag{32d}$$

$$-\lambda_2 (1-\alpha)\,\mathbb{E}\,[(d_t - (x_t)^+)^+] \tag{32e}$$

$$u_t^1\,\mathbb{E}\,[x_t] \tag{32f}$$

$$u_t^2\,\mathbb{E}\,[z_t] \tag{32g}$$

$$+\mathbb{E}\,[v_{t+1}(x_{t+1}, q_1, \ldots, q_{t-1}, q_t)]\}. \tag{32h}$$

Similarly, the objective function f can satisfy the following recursion:

$$f_t(y_t, x_t, q_1, \ldots, q_t) = -c(y_t - w_t)$$

$$+p\,\mathbb{E}\,[\min\{(x_t)^+, d_t\}] + p\alpha\,\mathbb{E}\,[(d_t - (x_t)^+)^+]$$

$$-h\,\mathbb{E}\,[(x_t - d_t)^+]$$

$$-\lambda_1 \alpha\,\mathbb{E}\,[(d_t - (x_t)^+)^+]$$

$$-\lambda_2 (1-\alpha)\,\mathbb{E}\,[(d_t - (x_t)^+)^+]$$

$$u_t^1\,\mathbb{E}\,[x_t]$$

$$u_t^2\,\mathbb{E}\,[z_t]$$

$$+\mathbb{E}\,[v_{t+1}(x_{t+1}, q_1, \ldots, q_{t-1}, q_t)]\}.$$

The arrivals in a particular period can be replaced by $\mathbb{E}\,[z_t] = \Sigma_{t' < t} \mathbb{P}\,\{1_{t'} = t - t'\} q_{t'}$, where $\mathbb{P}\,\{*\}$ can represent the probability given the state of knowledge at t. The probability can depend on whether a past order has arrived or not. The partial derivative of $f_t$ with respect to $y_t$ and the first order optimality condition can have a similar form as in (20) and (21) as shown below in (35). The expectation "$\mathbb{E}$" can be decomposed to lead time and demand components, by conditioning on lead time probability "$\mathbb{P}\,\{1_t = 1\}$" and demand expectation "$\mathbb{E}_d$".

$$\frac{\partial f_t}{\partial y_t}(y_t, \cdot) = -c + \mathbb{E}\left[\frac{\partial v_{t+1}}{\partial q_t}(\cdot)\right] = \tag{34}$$

$$-c + \left(\mathbb{P}\{l_t = 1\}\left(\mathbb{E}_d\left[\frac{\partial v_{t+1}}{\partial x_{t+1}}(\cdot)\right] - u_{t+1}^2\right) + \mathbb{P}\{l_t > 1\}\mathbb{E}_d\left[\frac{\partial v_{t+1}}{\partial q_t}(\cdot)\right]\right)$$

$$\Rightarrow \mathbb{P}\{l_t = 1\}\left(\mathbb{E}_d\left[\frac{\partial v_{t+1}}{\partial x_{t+1}}(\cdot)\right] - u_t^2\right) + \mathbb{P}\{l_t > 1\}\mathbb{E}_d\left[\frac{\partial v_{t+1}}{\partial q_t}(\cdot)\right] = c. \tag{35}$$

The interpretation of the expressions (34-35) can be the same as the constant lead time case. This time though, the effect in future value function can be carried through on-hand inventory (e.g., $q_t$ becomes part of $x_{t+1}$) if the order is received next period. Otherwise it can be carried as an open order e.g., $q_t$ stays as $q_t$). This result can be generalized to other periods as subsequent periods t+1 to T can be already optimized.

Regardless of when the order is going to arrive, the change in $y_t$ can propagate though the order put. The partial derivatives of the value function can be recursively derived in equation (36). The first term can tell that if the order $q_{t-i}$ increased, fewer orders would be placed in t; and this may bring an immediate benefit (e.g., cost reduction) of c per unit. As long as the differentiation variable $q_{t-i}$ and the current order quantity $q_t$ (if any) can be open orders (e.g., lines 18 and 20), the effect can be carried through a partial derivative of the value function with respect to them. Otherwise, they are part of the on-hand inventory (e.g., lines 17 and 20). The first, fourth, and fifth terms in the equation (36) can cancel each other following equation (35) and the subsequent logic explained to obtain the expression in (37).

$$\frac{\partial v_t}{\partial q_{t-1}}(\cdot) = c\,1_{(y_t^* > w_t)} + \mathbb{P}_t\{l_{t-i} = i+1\}\left(\mathbb{E}_d\left[\frac{\partial v_{t+1}}{\partial v_{t+1}}(\cdot)\right] - u_{t+1}^2\right) + \tag{36}$$

$$\mathbb{P}_t\{l_{t-1} > i+1\}\mathbb{E}_d\left[\frac{\partial v_{t+1}}{\partial q_{t-i}}(\cdot)\right] -$$

$$1_{(y_t^* > w_t)}\mathbb{P}_t\{l_t = 1\}\left(\mathbb{E}_d\left[\frac{\partial v_{t+1}}{\partial x_{t+1}}(\cdot)\right] - u_{t+1}^2\right) -$$

$$1_{(y_t^* > w_t)}\mathbb{P}_t\{l_t > 1\}\mathbb{E}\left[\frac{\partial v_{t+1}}{\partial q_t}(\cdot)\right].$$

$$= \mathbb{E}\left[\frac{\partial v_{t+1}}{\partial q_{t-i}}(\cdot)\right], \forall i = 1, \ldots, L-2 \tag{37}$$

Combining the results in equations (33) and (34), the following expression can be derived:

$$\frac{\partial v_t}{\partial q_{t-1}}(\cdot) = \mathbb{P}_t\{l_{t-i} = i+1\}\left(\mathbb{E}_d\left[\frac{\partial v_{t+1}}{\partial x_{t+1}}(\cdot)\right] - u_{t+1}^2\right) + \tag{38}$$

$$\mathbb{P}_t\{l_{t-i} > i+1\}\mathbb{E}_d\left[\frac{\partial v_{t+1}}{\partial q_{t-1}}(\cdot)\right]$$

$$= \mathbb{P}_t\{l_{t-i} = i+1\}\left(\mathbb{E}_d\left[\frac{\partial v_{t+1}}{\partial x_{t+1}}(\cdot)\right] - u_{t+1}^2\right) +$$

$$\mathbb{P}_t\{l_{t-i} = i+2\}\left(\mathbb{E}_d\left[\frac{\partial v_{t+2}}{\partial x_{t+2}}(\cdot)\right] - u_{t+2}^2\right) +$$

$$\mathbb{P}_t\{l_{t-i} \geq i+2\}\mathbb{E}_d\left[\frac{\partial v_{t+2}}{\partial x_{t-i}}(\cdot)\right]$$

$$= \ldots$$

$$= \sum_{j \geq 1} \mathbb{P}_t\{l_{t-1} = i+j\}\left(\mathbb{E}_d\left[\frac{\partial v_{t+j}}{\partial x_{t+j}}(\cdot)\right] - u_{t+j}^2\right)$$

Equation (38) implicitly assumes that all orders may be eventually received. The finite horizon may require some sort of truncation towards the end. That particular logic is excluded here. Finally, the partial derivative with respect to the on-hand inventory available for fulfillment may not change and can be expressed as in equality (39). The first line of this expression can correspond to the immediate benefit due to ordering less. The second line can be the cost of underage and overage terms, respectively. If the ending inventory level for the period is positive, the change in value function can be carried to the future periods as shown in the third line. The last line can the future value change caused by the reduction in order quantity.

$$\frac{\partial v_t}{\partial x_t}(\cdot) = c\,1_{(y_t^* > w_t)} - u_t^1 + [\alpha\lambda_1 + (1-\alpha)(p+\lambda_2)]\mathbb{P}\{d_t > x_t\} - \tag{39}$$

$$h\mathbb{P}\{d_t \leq x_t\} + [1 - (1-\alpha)\mathbb{P}\{d_t > x_t\}]\mathbb{E}\left[\frac{\partial v_{t+1}}{\partial x_{t+1}}(\cdot)\right] -$$

$$1_{(y_t^* > w_t)}\left(\mathbb{P}\{l_t = 1\}\left(\mathbb{E}_d\left[\frac{\partial v_{t+1}}{\partial x_{t+1}}(\cdot)\right] - u_{t+1}^2\right) + \mathbb{P}\{l_t > 1\}\mathbb{E}_d\left[\frac{\partial v_{t+1}}{\partial q_t}(\cdot)\right]\right).$$

The first and the last lines cancel when the first order condition in (35) is applied to obtain:

$$\frac{\partial v_t}{\partial x_t}(\cdot) = \beta_t - \eta_t + \xi_t \mathbb{E}\left[\frac{\partial v_{t+1}}{\partial x_{t+1}}(\cdot)\right], \quad (40)$$

where $\beta_t = [-u_t^1 + \alpha\lambda_1 + (1-\alpha)(p+\lambda_2)]\mathbb{P}\{d_t > x_t\}$ $\eta_t = [u_t^1 + h]\mathbb{P}\{d_t \leq x_t\}$ $\xi_t = 1 - (1-\alpha)\mathbb{P}\{d_t > x_t\}$.

Returning back to the derivative of the objective function in (34), and combining with the result from equation (4), the partial derivative of the objective function with respect to y can be expressed as:

$$\frac{\partial f_t}{\partial y_t}(y_t, \cdot) = -c + \mathbb{E}\left[\frac{\partial v_{t+1}}{\partial q_t}(\cdot)\right] = \sum_{j\geq 1} \mathbb{P}\{l_t = j\}\left(\mathbb{E}_d\left[\frac{\partial v_{t+j}}{\partial x_{t+i}}(\cdot)\right] - u_{t+j}^2\right). \quad (41)$$

Once a scenario n sampling a demand path $d^n = \{d_1^n, \ldots, d_T^n\}$ and a lead time path $l^n = \{l_1^n, \ldots, l_T^n\}$ is generated, the associated stochastic gradients can be obtained as:

$$\nabla_{y_t}\hat{f}_t(y_t, \cdot, d^n, l^n) = -c + \left(\nabla_{x_{t+l_t^n}}\hat{v}_{t+l_t^n}(\cdot, d^n, l^n) - u_{t+l_t^n}^2\right) \quad (42)$$

$$\nabla_{x_t}\hat{v}_t(\cdot, d^n, l^n) = \hat{\beta}_t - \hat{\eta}_t + \hat{\xi}_t \nabla_{x_{t+1}}\hat{v}_{t+1}(\cdot, d^n, l^n) \quad (43)$$

where the scenario gradient counterparts of the terms $\beta$, $\eta$, and $\xi$ and can be:

$\hat{\beta}_t = [-u_t^1 + \alpha\lambda_1 + (1-\alpha)(p+\lambda_2)]1_{(d_t > x_t)}$ $\hat{\eta}_t = [u_t^1 + h]1_{(d_t > x_t)}$ $\hat{\xi}_t = 1 - (1-\alpha)1_{(d_t > x_t)}$.

Simplifications from equations (40, 41) can allow keeping track of only the particular partial derivatives $\nabla_{x_t} v_t$ and $\nabla_{y_t} f_t$ instead of the entire gradients.

Turning to FIG. 6, the figure illustrates example interface between the adaptive capacity control tool 310 and the ordering model tool 320. In particular, A constraint 610 can be inputted to the adaptive capacity control tool 310. The constraint 610 can include an inventory constraint (e.g., storage and/or receipt constraints) and, optionally, a supplier constraint described over a time period for an item category. In turn, the adaptive capacity control tool 310 can generate an opportunity cost 620 for the item category over the time horizon. This opportunity cost 620 may be inputted over, for example, an outer loop to the ordering model tool 320, along with other parameters (such as a supplier capacity constraint if one is not included in the constraint 610).

The ordering model tool 320 may then simulate supply and demand, given the opportunity cost 620 and the parameters 630 and search for an optimum consumption of the constraint 610. The simulation may use an objective function and can include an inner loop, where the ordering model tool 320 may simulate various inventory levels for an item of the item category and determine therefrom an optimization of the objective function. The inner loop may include an iterative simulation of the inventory level until a convergence criterion is satisfied, such as one that may optimize the objective function. That inventory level can be used to determine a consumption of the inventory capacity. If the consumption violates the constraint 610, information about the violation may be fed over the outer loop back to the adaptive capacity control tool 310.

The adaptive capacity control tool 310 can explore adjustments to the opportunity cost 620 based on the violation. In an example, the adaptive capacity control tool 310 can implement a sub-gradient algorithm to derive the adjustments. Generally, if a capacity is underused, the opportunity cost 620 may be decreased. On the other hand, if the capacity is overused, the opportunity cost 620 may be increased. The step size and direction generated by the sub-gradient algorithm can be used to adjust the opportunity cost 620 in each iteration. Thereafter, adjusted opportunity cost 620 can be re-inputted into the ordering model tool 320 for another simulation. This iterative process between simulation, determining violations, and adjusting the opportunity costs may be repeated until convergence 640.

The convergence 640 may include multiple convergence criteria. One criterion may simply be the number of iterations or some time-out call based on the use of the outer loop. Another criterion may include a discrepancy threshold. For example, if the discrepancy between the capacity consumption and the capacity constraint is within an acceptable range, this convergence criterion may be met. Another criterion may include direction and scale of change of the violation after each iteration. For example, if after a number of iterations, the discrepancy between the capacity consumption and the capacity constraint has not changed much (e.g., the change is within a predefined range) convergence may have occurred.

Once convergence 640 occurs, the ordering model tool 320 may output an ordering decision 650 for an item of the item category. This ordering decision 650 may apply to a particular time period of the time horizon, but may account for all constraints across the plurality of time periods of the time horizon. The ordering decision 650 may also account for parameters of other items of the same category because, for example, the opportunity cost 620 for that item category may have been used in generating the ordering decision 650.

Accordingly, the example interface between the adaptive capacity control tool 310 and the ordering model tool 320 may optimize use of a capacity constraint over a time horizon. To illustrate, if there is a capacity violation in one or more weeks, the adaptive capacity control tool 310 may use the interface and the associated iterative process to determine the optimal capacity parameters (e.g., the opportunity cost 620) that can maximize the objective function of the ordering model tool 320 while respecting all capacity constraints. This optimization can involve a search tier the optimal Lagrange multipliers (e.g., opportunity costs of capacity constraints for each week) associated with constrained capacity to maximize the objective function in a multi-item (e.g., item category), multi-period scenario. The optimization can follow the approach of solving constrained optimization problems, e.g., decoupling the optimization into multiple phases. In a first phase, the inner loop (solving for single-item optimization problem) can use Lagrange multipliers as inputs and determine the optimal order up-to level to optimize the objective function. In a second phase, the outer loop (solving for multi-item, multi-period optimization problem) can use the results of the single-item problems as inputs. The inner and outer loops depend on the output of each other, and can be solved iteratively until convergence to the optimal solution. As long as the single-item problem can be solved to optimality, the optimal solution for the constrained problem (e.g., the multi-item, multi-period) can be found through the iterative search for optimal Lagrange multipliers.

Figure 7:
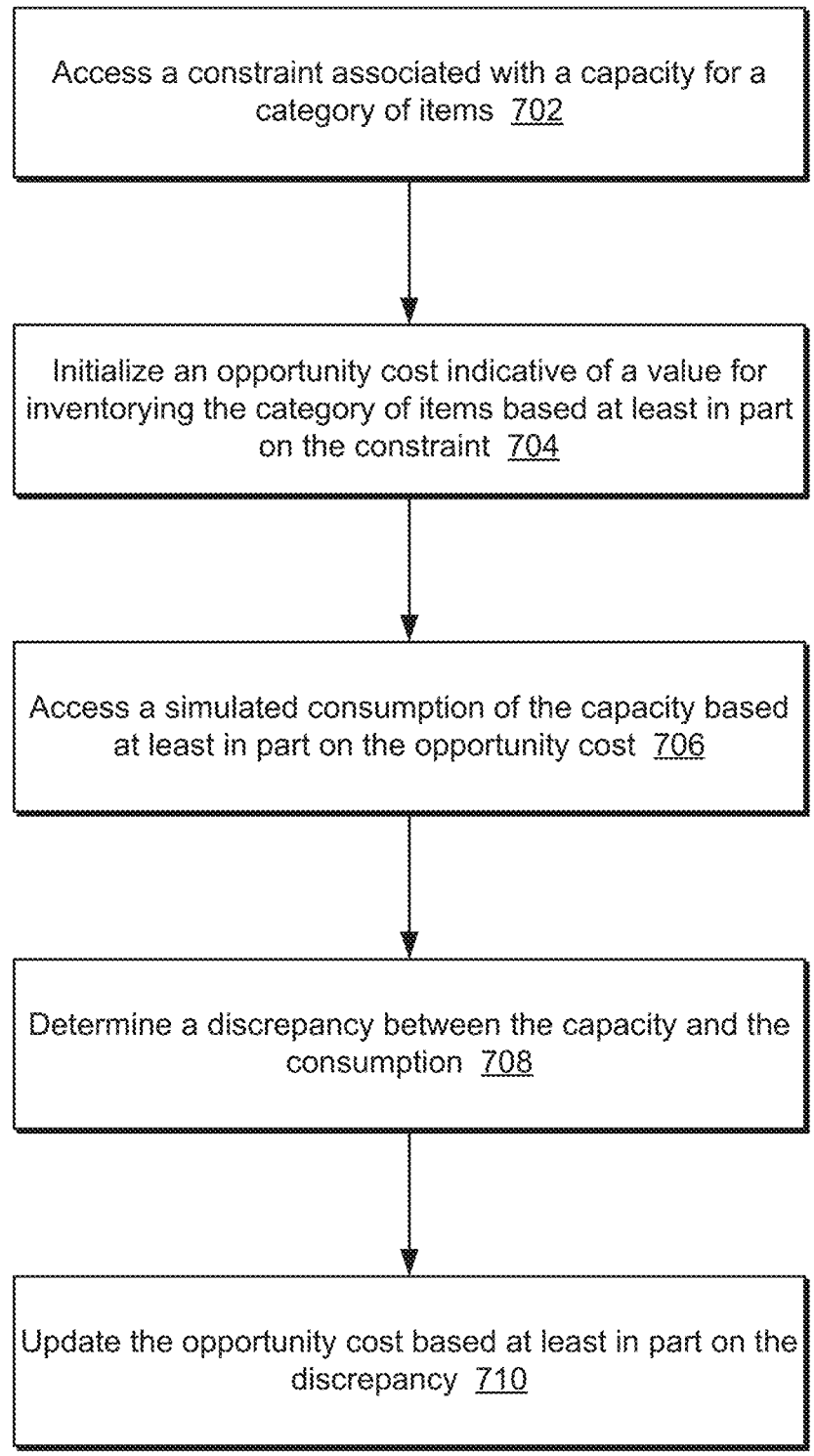
FIG. 7 is a flow diagram illustrating an example process for determining a value associated with a constraint, according to embodiments.
Figure 8:
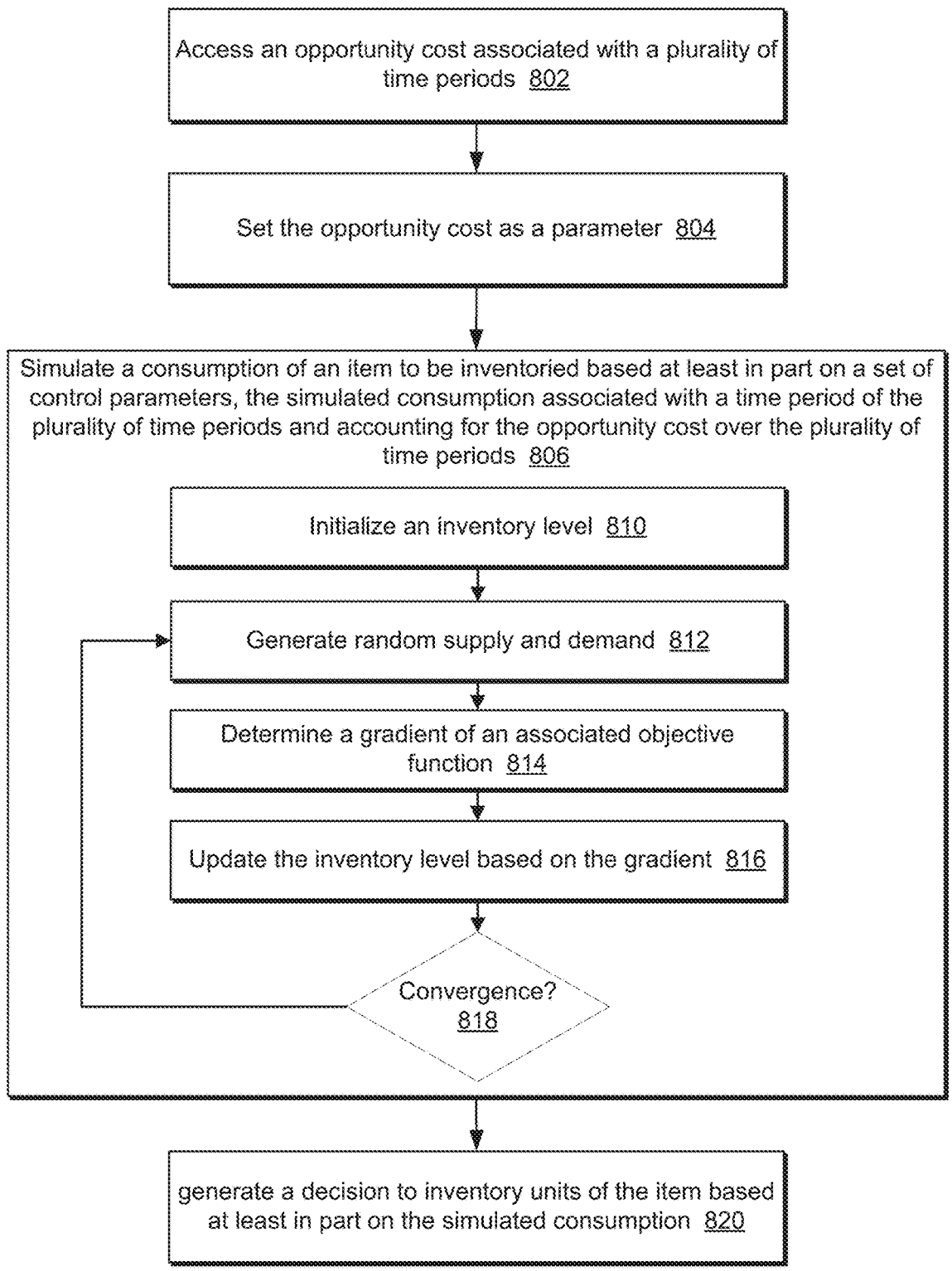
FIG. 8 is a flow diagram illustrating an example process for ordering units of an item for inventorying.
Figure 9:
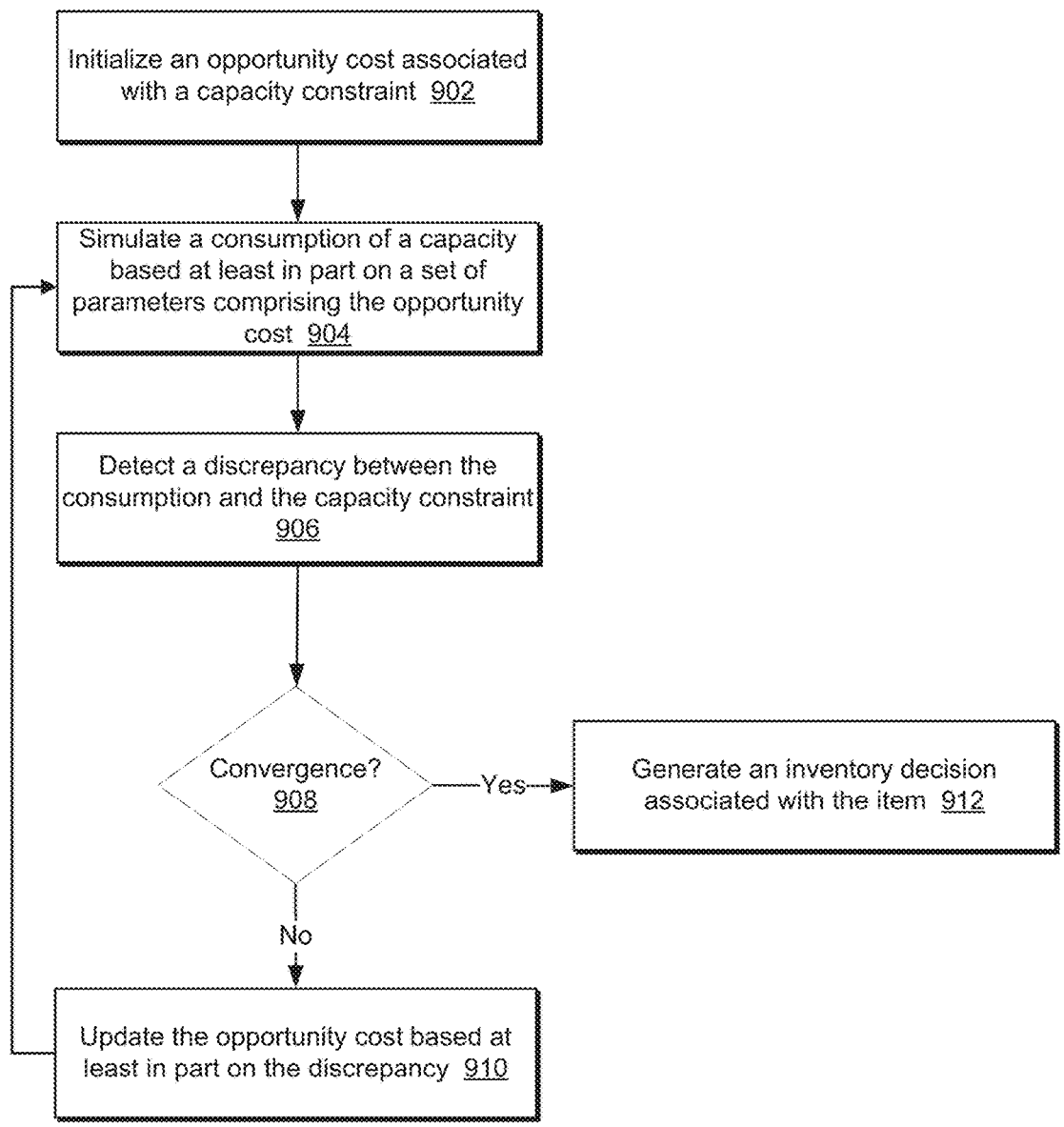
FIG. 9 is a flow diagram illustrating an example process for ordering units of an item for inventorying based at least in part on a value associated with a constraint.

Turning to FIGS. 7-9, flow diagrams illustrate example processes for generating opportunity costs and ordering decisions. FIG. 7 illustrates an example process for generating opportunity costs based on constrains. In comparison, FIG. 8 illustrates an example process for generating ordering decisions based on parameters including opportunity costs. FIG. 9 illustrates an example process for finding optimum opportunity costs and, accordingly, generating ordering decisions. Some of the operations of the example processes of FIGS. 7-9 may be similar. Such similarities are not repeated herein in the interest of clarity of explanation.

Further, in the illustrative operations, each of the operations or functions may be embodied in, and fully or partially automated by, modules executed by one or more processor devices of a computing system. For example, an adaptive capacity control tool, an ordering model tool, or some other modules executed on one or more computing systems may perform certain operations of the flows. Nevertheless, other or a combination of other modules may be additionally or alternatively used. Also, while the operations are illustrated in a particular order, it should be understood that no particular order is necessary and that one or more operations may be omitted, skipped, and/or reordered.

The example flow of FIG. 7 may start at operation 702, where an adaptive capacity control tool, such as the adaptive capacity control tool 310, may access a constraint associated with a capacity for a category of items. The capacity may include an inventory capacity such as receipt and/or storage capacities. In an embodiment, the capacity may additionally or alternatively include a supplier capacity. The constraint may be associated with an item category over a time horizon including a plurality of time periods. Various techniques may be implemented to access the constraint. For example, the adaptive capacity control tool may provide or interact with an interface configured to receive user input defining the constraint. In another example, the adaptive capacity control tool may derive the constraint based on analyzing historical data about past performances.

At operation 704, the adaptive capacity control tool may initialize an opportunity cost indicative of a value for inventorying the item category based at least in part on the constraint over the time horizon. A default opportunity cost may be used, such as all zeroes. In another example, the most current or last used opportunity cost can be selected.

At operation 706, the adaptive capacity control tool may access a simulated consumption of the capacity over the time horizon based at least in part on the opportunity cost. The access may include, for example, interacting with an ordering model tool configured to simulate the consumption. This interaction can be performed over an outer loop, while the simulation can be performed over an inner loop. The ordering model tool may use the opportunity cost as a parameter, among other parameters, to simulate the consumption for one or more items of the item category and for each time period of the time horizon.

At operation 708, the adaptive capacity control tool may determine a discrepancy between the capacity and the consumption. For example, the adaptive capacity control may receive capacity from the ordering model tool and compare the consumption to the capacity.

At operation 710, the adaptive capacity control tool may update the opportunity cost based at least in part on the discrepancy. For example, if the discrepancy fails a convergence criterion, the adaptive control may determine an adjustment to the opportunity cost that may mitigate the discrepancy. This determination can use, for example, a sub-gradient algorithm that may search for Lagrange multipliers that can optimize an objective function used in simulating the consumption. The opportunity cost can be adjusted based on the step size and direction from the search. To illustrate, if the consumption overuses the capacity, the adaptive capacity control tool may increase the cost. Otherwise, a decrease may be performed.

Adjusting the opportunity cost can be followed by re-simulating the consumption and determining the discrepancy. This iterative process can be repeated until convergence may occur. At that point, an optimum opportunity cost over the time horizon may have been determined.

In addition, an opportunity cost for an item category may be automatically generated or updated, as described in the example flow of FIG. 7, based on a trigger event. The trigger event may be time-based, inventory-based, supplier-based, and/or alarm-based. An example time based trigger event may include a time interval, such as a predefined time period or a random time interval. Another trigger event may include changes in capacity constraints, inventory parameters, or parameters of simulated supply and demand. These changes may capture changes in forecast distributions, promotion of new buying settings, and/or other supply or demand changes. An example supplier-based trigger event may include an update of a supplier constraint.

Because generating or updating the opportunity cost can be automated, alarms and/or auditing mechanisms to prevent erroneous, missing, and/or stale capacity parameters (e.g., opportunity costs) may be implemented. For example, a failure to complete a refresh of capacity parameters within a predefined timeframe, a failure of dependent services to provide associated data (e.g., providing updated capacities, providing simulations, etc.), and/or other failures may be used to generate an alarm. Further, if the capacity parameters meet or exceed guardrails, an alarm may be triggered. Similarly, simulated and actual output metrics (e.g., metrics associated with supply, demand, overall performance, latencies, and/or truncations of items to be inventoried) may be monitored. If the difference between the two exceeds a threshold, an alarm may be triggered. When an alarm is triggered, an audit workflow may be used to determine a cause of the alarm and adjust, for example, the opportunity costs and/or the capacity constraints.

Turning to FIG. 8, the figure illustrates an example process for generating an ordering decision. Generally, this decision can relate to a particular time period, such as the immediate next time period, while also accounting for constraints over an entire time horizon. In addition, the decision can relate to a particular item of an item category, while also accounting for parameters, such as opportunity cost, that may apply to the entire item category.

The example process of FIG. 8 may start at operation 802, where an ordering model tool may access an opportunity cost associated with a plurality of time periods. The plurality of time periods may form a time horizon. The opportunity cost may also be associated with an item category. The access may include receiving this cost from an adaptive capacity control tool. In another embodiment, the access may include accessing the opportunity from storage independently of an adaptive capacity control tool.

At operation 804, the ordering model tool may set the opportunity cost as a parameter. At this operation, the ordering model tool may also consider other parameters. These parameters may be related to the item category and/or to particular items in the item category. For example, the ordering model tool may receive from a supplier, or may derive from historical data, a supplier constraint. The historical data can include past inventory performances associated with the supplier. The derivation of the supplier constraint from this data may include analyzing a performance for a particular time period relative to a plurality of other time periods. Other parameters may also include, for example, profitability of an item, long term value of inventorying the item such as an in-stock value, holding cost, capital cost, loss cost, recovery cost, acquisition cost, profit margin, volume, velocity and/or other item-related parameters.

At operation 806, the ordering model tool may simulate a consumption of an item to be inventoried based at least in part on a set of parameters. The simulated consumption can be for each time period of the plurality of time periods. A simulated consumption for one time period may account for the opportunity cost, and thereby the constraint, over the plurality of time periods. In an embodiment, an objective function may be used to simulate supply and demand for an item over the plurality of time periods. Lagrange multipliers can be used to search for an optimized objective function value in each time period. The search can include an inner loop where, for example, different inventorying levels for the item may be simulated to determine an optimum inventory level in each time period, This level may be translated into a simulated consumption value based on a comparison to an existing inventory level.

For example, and as illustrated in FIG. 8, operation 806 may include a number of operations 810-818, some of which may be iteratively repeated until convergence. At operation 810, the ordering model tool may initialize an inventory level. The initial estimates can come from various sources. For instance, the initial estimates may use the inventory level from the last simulation (e.g., the last time horizon). At operation 812, the ordering model tool may generate a random supply and a random demand. For instance, a set of random supply-demand scenarios may be created and stored. A scenario may include a stream of random variables for demand and lead times. At operation 814, the ordering model tool may determine a gradient of an objective function associated with the random supply and demand. For instance, given one or more of the scenarios, the gradient of the objective function may be calculated. The objective function can be expressed as a function of the different parameters including the opportunity cost. At operation 816, the inventory level may be updated based on the gradient. For instance, a step size may be determined in the direction of the gradient and used to update the inventory level. The ordering model tool may implement a harmonic step-size rule, a McClain's step-size rule, a Kesten's step-size rule, and/or a bias-adjusted Kalman filter step-size rule (BAKF) to calculate the step size. Operations 812-816 may be iteratively repeated until a convergence criterion is met at operation 818. The convergence criterion may be based on the number of iterations and/or improvements to the objective function such as changes to the step sizes between iterations. For example, the convergence criterion may include a condition on the step sizes size such as non-negativity, sum going to infinity, expected sum of squares being finite, and/or other conditions. Once convergence occurs, the corresponding inventory may be used.

At operation 820, the ordering model tool may generate a decision to inventory units of the item based at least in part on the simulated consumption. For example, the ordering model may compare the inventory level from the simulation to an existing inventory level. The difference between the two may be used as a quantity to order in the decision. Further, the ordering model tool may compare how much of capacity may be consumed to inventory the simulated inventory level (or the difference).The capacity may be associated with the opportunity cost. If the capacity is not violated (e.g., over-used or under-used), the ordering model tool may determine that the consumption and associated inventory level may represent an optimum value and, accordingly, may generate a purchase order. Otherwise, the ordering model tool may report a discrepancy between the capacity and the consumption to the adaptive capacity control tool. In turn, that tool may adjust and provide the opportunity cost for another simulation. This process can be iteratively repeated until convergence to an optimum inventory level.

Turning to FIG. 9, the figure illustrates an example flow for an iterative interaction between an adaptive capacity control tool and an ordering model tool. This interaction may allow using an outer loop to pass a constraint associated with an item category over a time horizon and expressed as an opportunity cost to an inner loop. In turn, the inner loop may use this information as part of searching for an optimum solution for ordering an item of the category of items over one or more of time periods of the time horizon. Resulting information may be passed back to the outer loop for refinement of the opportunity cost. This outer-inner loop iterative interaction may allow finding an optimum solution at both an item category, multi-period level and at a single-item level. The example operations may be performed by a computing system configured to implement an adaptive capacity control tool and an ordering model tool, such as the inventory management system 210.

The example flow of FIG. 9 may start at operation 902, where the computing system may initialize an opportunity cost associated with a constraint. This cost maybe generated and/or provided by the adaptive capacity control tool and can be associated with an item category and expressed over a time horizon.

At operation 904, the computing system may simulate a consumption of a capacity based at least in part on a set of parameters comprising the opportunity cost. This simulation may be generated and/or provided by an ordering model tool and can include a simulated consumption for a particular item of the item category over each time period of the time horizon. The simulated consumption for a time period may account for the constraint across the entire time horizon, rather than only the constraint specific to that time period.

At operation 906, the computing system may detect a discrepancy between the consumption and the capacity constraint. For example, the computing system may compare the simulated consumption to the capacity to determine a difference between the two.

At operation 908, the computing system may determine whether the consumption and the capacity constraint converge. Various convergence criteria may be used including one or more of iteration-based, feasibility-based, and objective-function based criteria. For example, one criterion may include the number of iterations or a time-out call, Another criterion may include a discrepancy threshold, such as an acceptable range of discrepancies. Yet another criterion may include direction and scale of change of the discrepancy after each iteration. Similarly, the simulation at operation 804 may use an objective function. If improvements to the objective functions are not observed, minimal improvements are observed, and/or minimal improvements are dependent on the scale and velocity of changes for an optimum objective function value between iterations, convergence may have occurred. If convergence has not occurred, operation 910 may be performed. Otherwise, operation 912 may be performed.

At operation 910, the computing system may update the opportunity cost based at least in part on the discrepancy. For example, a sub-gradient algorithm, Lagrange multipliers, and an objective function can be used to determine an adjustment that can result in an optimum solution given the constraint. Generally, if the capacity is overused, the opportunity can be increased; otherwise, the opportunity cost can be decreased. As illustrated in FIG. 9, once the opportunity cost is adjusted, the computing system may re-perform operation 904. The operations 904-910 may be iteratively repeated until convergence occurs at operation 908.

At operation 912, convergence may have occurred. Accordingly, the computing system may generate an inventory decision associated with the item. This decision can include an ordering decision in the next time period based on the constraint across the entire time horizon and the opportunity cost of the item category. This decision can similarly include an ordering plan for the remaining time periods of the time horizon.

Figure 10:
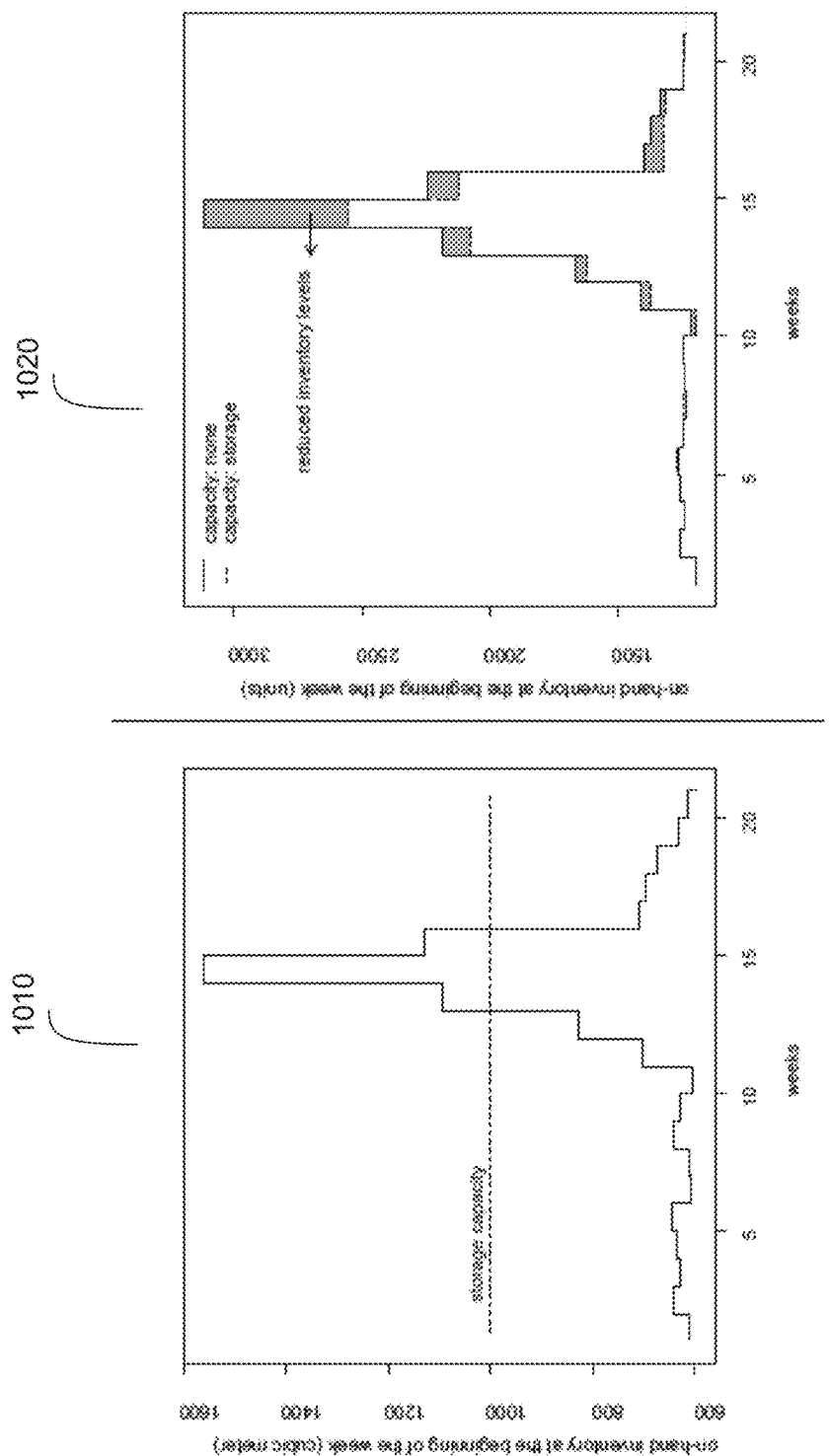
FIGS. 10-12 are graphs illustrating comparisons between example capacities, according to embodiments.
Figure 11:
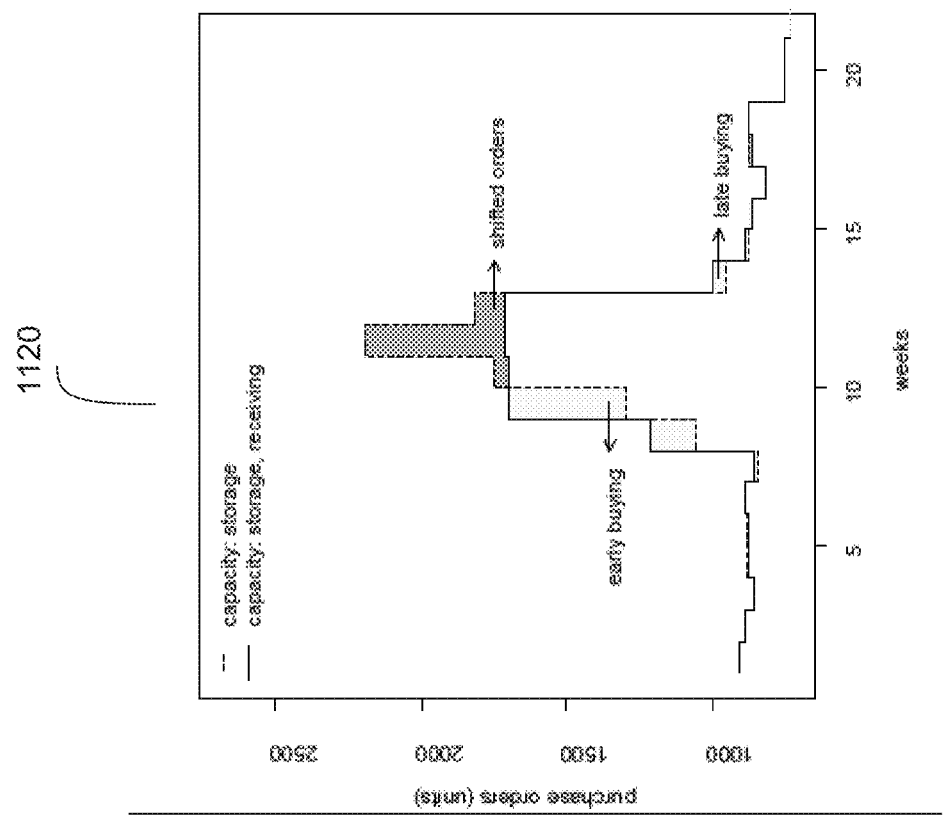
Figure 12:
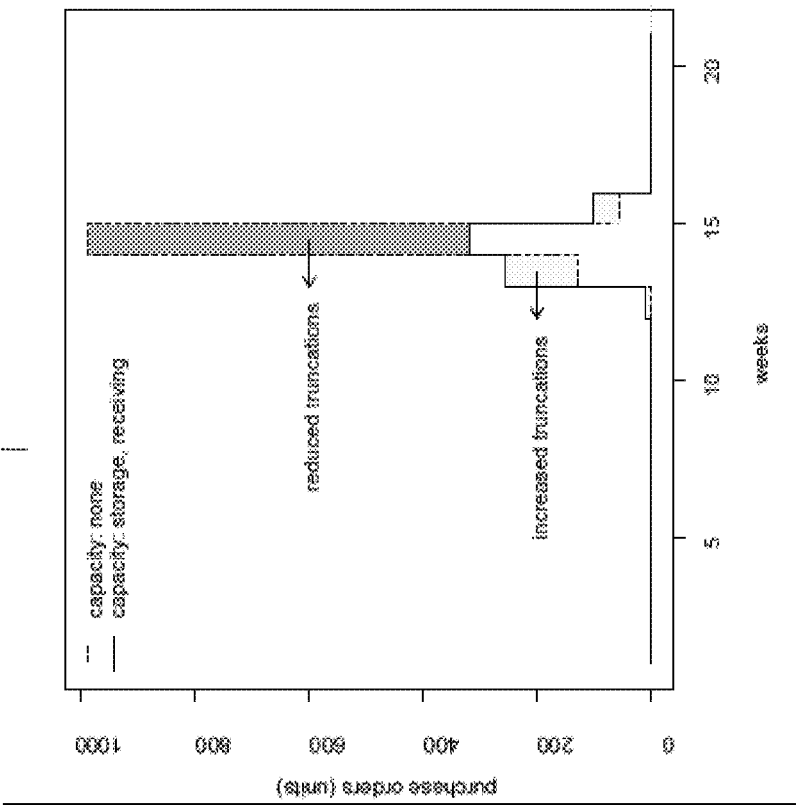
Figure 12:
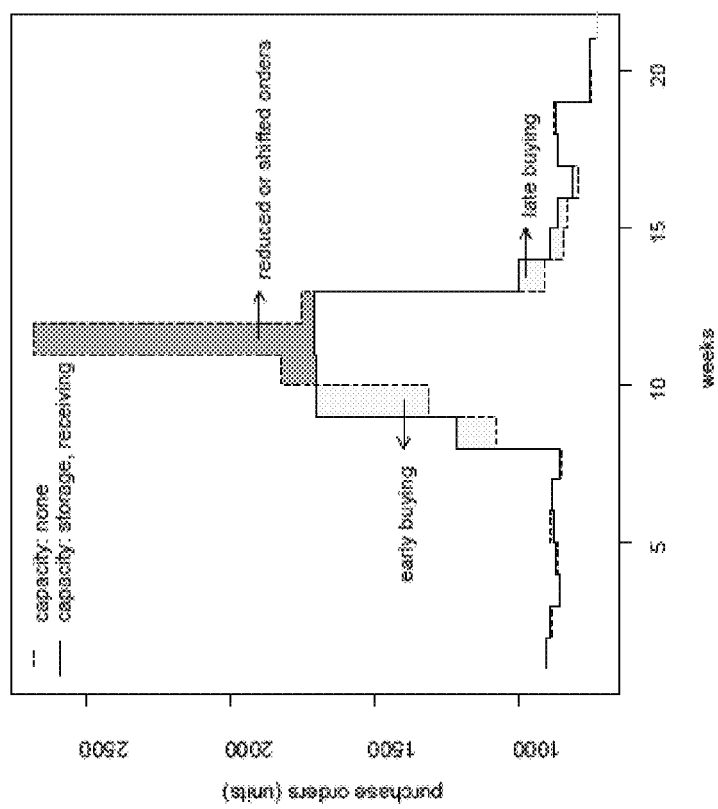

Turning to FIGS. 10-12, the figures illustrate a case study demonstrating examples on how implementing an adaptive capacity control tool and ordering model tool may affect buying. A set of hypothetical items is used and includes differences in acquisition cost, profit margin, volume, and velocity attributes. Then, the multi-period inventory optimization problem is solved with aggregate-level constraints on storage and receipt capacities. The described results are analyzed at an aggregate level and comparisons between items are drawn based on their attributes.

A set of hypothetical items is generated in order to reflect the buying differences with respect to some attributes. The acquisition cost ($), profit margin (%), volume (cubic meters), and velocity (units/week) attributes are considered. Further, two levels for each attribute (refer to Table 2) are considered. Sixteen items are generated.

A twenty-week period is considered over which to optimize. For these items, a given velocity parameter is treated as the "non-peak" demand rate. The demand through periods, eleven to fifteen, is scaled respectively, with 1.2, 1.5, 2, 3 and 2 to simulate the peaking of demand. Fifty weekly demand scenarios are generated, using this scaled velocity parameter as the rate of the Poisson distribution. A constant lead time of three weeks, a constant receiving capacity of 1,700 units per week, and a constant storage capacity of 1,000 cubic meters are assumed. These capacity parameters are assumed to restrict the expected arrivals and expected on-hand inventory levels at the beginning of each week. The problem is modeled as a two stage Stochastic Linear Program (SLP) and the model solutions are simulated to measure the effect on economic metrics and truncations.

FIGS. 10-12 represent the solutions of the model. If no capacity restrictions existed, we would observe the expected inventory volume 1010 of FIG. 10. When only the storage capacity restrictions are imposed, the expected on-hand inventory levels 1020 of FIG. 10 are obtained. The expected on-hand inventory is reduced below the storage capacity. The inventory reduction continues after the capacity restriction is active as lower inventory is available for carrying over. Hence, a "buy less" phenomenon occurs.

After this, arriving purchase orders 1110 may be as illustrated in FIG. 11. These are also above the capacity limits, This leads to shifting of those arrivals to earlier periods with underutilized capacities. Therefore, they may cause "buying early," and the purchasing quantities are altered to meet the storage and receiving capacities. This is shown as element 1120 in FIG. 11.

Element 1210 of FIG. 12 shows the difference in optimal orders between the un-capacitated solution and after both capacity restrictions are applied. The constraints reduce orders, facilitate early buying, but also induce late buying (e.g., just in time) for future periods, which were to some extent fed by leftover inventory from the capacity restricted periods.

In order to compare the item level results, future truncations may be allowed. The model capacities are used as is and implement a simple heuristic if there are violations. A heuristic can be used to first calculate a volume or quantity to remove and then cancel some of the arriving orders proportional to their volume or quantity.

Finally, when these results are simulated and truncations are allowed, an overall reduction in truncations is obtained. There is some increase in earlier periods, which can be attributed to buying-early increasing utilization of receiving capacity bringing it to the limit. These are illustrated as element 1220 in FIG. 12.

The simulation demonstrates the change in economic metrics, some of which are tabulated in Table 1. In the capacity unaware buying scenario, buying is modeled without consideration of capacity constraints, and truncation systems can account for any capacity violations. In the capacity aware buying scenario, buying across time periods is adjusted to account for capacity constraints. The model solution leads to a three percent increase in sales and sales revenue, which corresponds to a twenty-six percent improvement in customer profit (CP).

TABLE 1

Economic results

|  | Sales | Revenue | CP | CP-CoC |
|---|---|---|---|---|
| Capacity unaware buying | 24,617 | 1,504,041 | 86,852 | 86,373 |
| Capacity aware buying | 25,394 | 1,550,697 | 109,562 | 109,045 |
| Difference | 3.2% | 3.1% | 26.1% | 26.2% |

Different item types are treated differently by the method. The largest difference is seen in, respectively, volume and velocity. For instance, the orders for large products were lowered, but their sales increased at the same time. This indicates a preference towards products with more sales potential. Truncation has decreased across all item types as expected. The details of this table can be found in Table 4.

TABLE 2

Attribute levels and corresponding values

| Cost | Margin | Volume | Velocity |
|---|---|---|---|
| 100 | 0.20 | 1.00 | 100 |
| 10 | 0.02 | 0.01 | 10 |

TABLE 3

Results by item type

|  | ΔOrders | ΔTruncation | ΔSales |
|---|---|---|---|
| Cost |  |  |  |
| High | 1.8% | −27% | 3.1% |
| Low | 0.8% | 55.9% | 3.2% |

TABLE 3-continued

Results by item type

|  | ΔOrders | ΔTruncation | ΔSales |
|---|---|---|---|
| Margin | | | |
| High | 1.7% | −31.9% | 3.2% |
| Low | 0.8% | −1% | 3.2% |
| Velocity | | | |
| High | 1.3% | −39.8% | 3.2% |
| Low | 0.5% | −57.4% | 2.8% |
| Volume | | | |
| Large | −0.3% | −45.1% | 1.6% |
| Small | 2.9% | −37.8% | 4.7% |

TABLE 4

Orders, truncations and sales change for all items

| item | Cost | Margin | Velocity | Volume | ΔOrders | ΔTruncation | ΔSales |
|---|---|---|---|---|---|---|---|
| 1 | high | high | high | large | 2% | −25.7% | 3.2% |
| 2 | high | high | high | small | 2.1% | −24.1% | 3.2% |
| 3 | high | high | low | large | 1.1% | −30.5% | 2.3% |
| 4 | high | high | low | small | 0.7% | −26.7% | 1.7% |
| 5 | high | low | high | large | 1.2% | −30% | 2.7% |
| 6 | high | low | high | small | 2.1% | −25.4% | 3.4% |
| 7 | high | low | low | large | 0.5% | −48.9% | 2.8% |
| 8 | high | low | low | small | 2.4% | −27.5% | 3.8% |
| 9 | low | high | high | large | 0.6% | −34.5% | 2.3% |
| 10 | low | high | high | small | 2.3% | −33.8% | 3.9% |
| 11 | low | high | low | large | −0.9% | −68.1% | 1.2% |
| 12 | low | high | low | small | 3.7% | −87.6% | 7.6% |
| 13 | low | low | high | large | −4.6% | −85.9% | −1.2% |
| 14 | low | low | high | small | 5.1% | −60.1% | 8.1% |
| 15 | low | low | low | large | −8.9% | −84.4% | −5.8% |
| 16 | low | low | low | small | 5.3% | −79.7% | 8.4% |
| | | | Grand Total | | 25794 | 1.3% | −41.4% |

Figure 13:
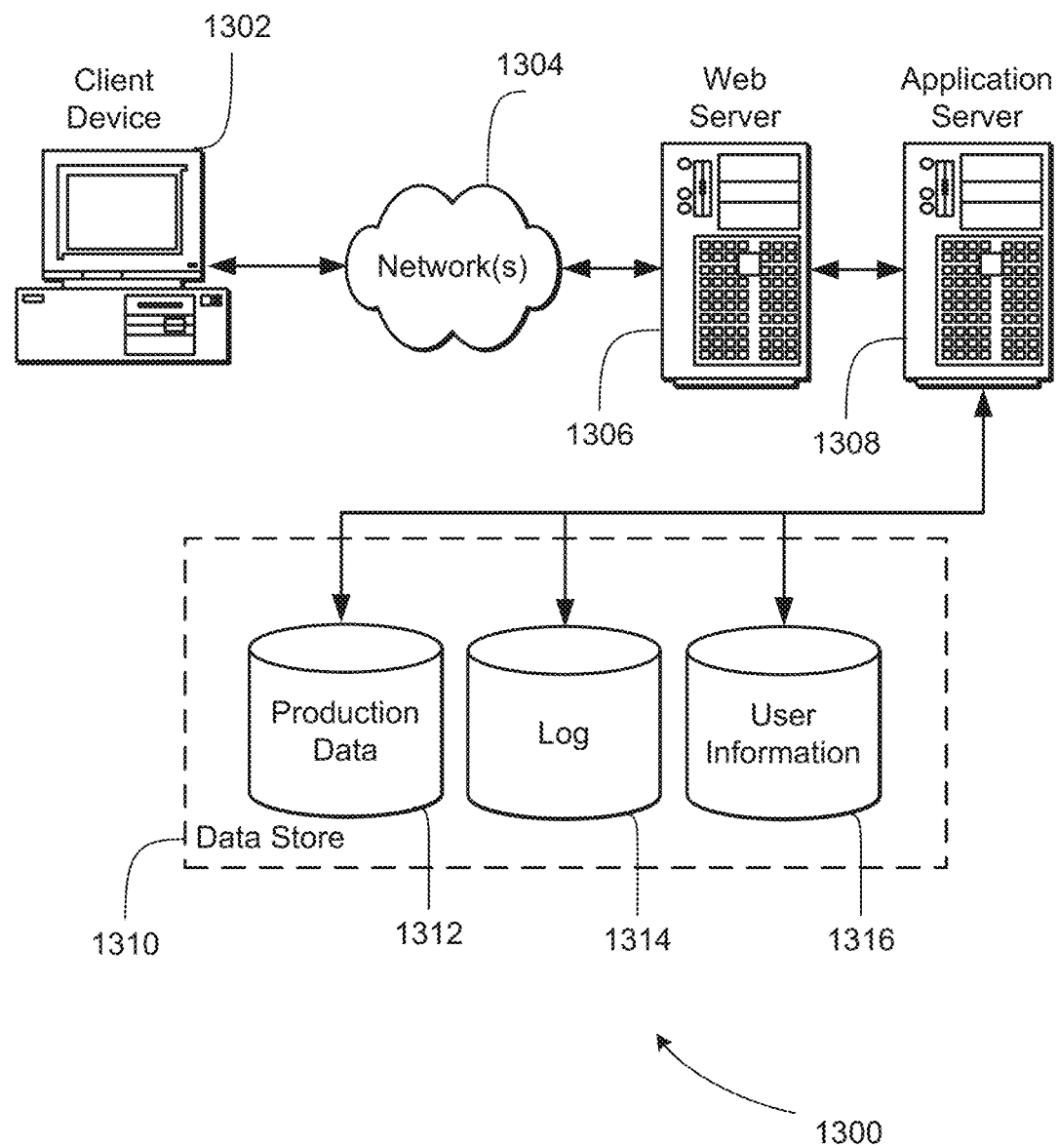
FIG. 13 is a block diagram illustrating a computing environment in which various embodiments can be implemented.

Turning to FIG. 13, the figure illustrates aspects of an example environment 1300 capable of implementing the above-described structures and functions. As will be appreciated, although a Web-based environment is used for purposes of explanation, different environments may be used, as appropriate, to implement various embodiments. The environment includes an electronic client device 1302, which can include any appropriate device operable to send and receive requests, messages, or information over an appropriate network(s) 1304 and convey information back to a user of the device. Examples of such client devices include personal computers, cell phones, handheld messaging devices, laptop computers, set-top boxes, personal data assistants, electronic book readers, wearable computing devices, or any other computing device. In some embodiments, consumers 140 and/or sellers 130 as shown in FIG. 1 may use such electronic client devices to communication with the service provider 110. The network(s) 1304 can include any appropriate network, including an intranet, the Internet, a cellular network, a local area network or any other such network or combination thereof. Components used for such a system can depend at least in part upon the type of network and/or environment selected. Protocols and components for communicating via such a network are well known and will not be discussed herein in detail. Communication over the network can be enabled by wired or wireless connections and combinations thereof. In this example, the network includes the Internet, and the environment includes a network server 1306 for receiving requests and serving content in response thereto, although for other networks an alternative device serving a similar purpose could be used as would be apparent to one of ordinary skill in the art.

The illustrative environment includes at least one application server 1308 and a data store 1310. In some embodiments, the inventory management system 210 shown in FIG. 2 is implemented using such an application server. It should be understood that there can be several application servers, layers, or other elements, processes or components, which may be chained or otherwise configured, which can interact to perform tasks such as obtaining data from an appropriate data store. As used herein the term "data store" refers to any device or combination of devices capable of storing, accessing, and/or retrieving data, which may include any combination and number of data servers, databases, data storage devices and data storage media, in any standard, distributed or clustered environment. The application server can include any appropriate hardware and software for integrating with the data store as needed to execute aspects of one or more applications for the client device, handling a majority of the data access and business logic for an application. The application server 1308 provides access control services in cooperation with the data store 1310, and is able to generate content such as text, graphics, audio files and/or video files to be transferred to the user, which may be served to the user by the Web server in the form of HTML, XML or another appropriate structured language in this example. The handling of all requests and responses, as well as the delivery of content between the client device 1302 and the application server 13008, can be handled by the network server 1306. It should be understood that the network and application servers 1306 and 1308 are not required and are merely example components, as structured code discussed herein can be executed on any appropriate device or host machine as discussed elsewhere herein.

The data store 1310 can include several separate data tables, databases or other data storage mechanisms and media for storing data relating to a particular aspect. For example, the data store 1310 illustrated includes mechanisms for storing production data 1312 and user information 1316, which can be used to serve content for the production side. The data store 1310 is also shown to include a mechanism for storing log data 1314, which can be used for reporting, analysis, or other such purposes. In some embodiments, the inventory data store 212 as shown in FIG. 2 is implemented in such a data store. It should be understood that there can be many other aspects that may need to be stored in the data store 1310, such as for page image information and to access correct information, which can be stored in any of the above listed mechanisms as appropriate or in additional mechanisms in the data store 1310. The data store 1310 is operable, through logic associated therewith, to receive instructions from the application server 1308 and obtain, update or otherwise process data in response thereto. In one example, a user might submit a search request for a certain type of item. In this case, the data store might access the user information to verify the identity of the user, and can access the catalog detail information to obtain information about items of that type. The information then can be returned to the user, such as in a results listing on a network page that the user is able to view via a browser on the client device 1302. Information for a particular item of interest can be viewed in a dedicated page or window of the browser.

Each server typically will include an operating system that provides executable program instructions for the general administration and operation of that server, and typically will include a non-transitory computer-readable storage medium (e.g., a hard disk, random access memory, read only memory, etc.) storing instructions that, when executed by a processor of the server, allow the server to perform its intended functions. Suitable implementations for the operating system and general functionality of the servers are known or commercially available, and are readily implemented by persons skilled in the art, particularly in light of the disclosure herein.

The environment in one embodiment is a distributed computing environment utilizing several computer systems and components that are interconnected via communication links, using one or more computer networks or direct connections. However, it will be appreciated by those of skilled in the art that such a system could operate equally well in a system having fewer or a greater number of components than are illustrated in FIG. 13. Thus, the depiction of environment 1300 in FIG. 13 should be taken as being illustrative in nature, and not limiting to the scope of the disclosure.

The various embodiments further can be implemented in a wide variety of operating environments, which in some cases can include one or more user computers, computing devices or processing devices which can be used to operate any of a number of applications. User or client devices can include any of a number of general purpose personal computers, such as desktop or laptop computers running a standard operating system, as well as cellular, wireless and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems and other devices capable of communicating via a network.

Most embodiments utilize at least one network that would be familiar to those skilled in the art for supporting communications using any of a variety of commercially-available protocols, such as TCP/IP, OSI, FTP,UPnP, NFS, CIFS, and AppleTalk. The network can be, for example, a local area network, a wide-area network, a virtual private network, the Internet, an intranet, an extranet, a public switched telephone network, an infrared network, a wireless network, and any combination thereof.

In embodiments utilizing a network server, the network server can run any of a variety of server or mid-tier applications, including HTTP servers, FTP servers, CGI servers, data servers, Java servers, and business application servers. The server(s)) may also be capable of executing programs or scripts in response to requests from user devices, such as by executing one or more Web applications that may be implemented as one or more scripts or programs written in any programming language, such as Java®, C, C# or C++, or any scripting language, such as Perl, Python or TCL, as well as combinations thereof. The server(s) may also include database servers, including without limitation those commercially available from Oracle®, Microsoft®, Sybase®, and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network (SAN) familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch screen or keypad), and at least one output device (e.g., a display device, printer or speaker). Such a system may also include one or more storage devices, such as disk drives, optical storage devices, and solid-state storage devices such as RAM or ROM, as well as removable media devices, memory cards, flash cards, etc.

Such devices also can include a computer-readable storage media reader, a communications device (e.g., a modem, a network card (wireless or wired), an infrared communication device, etc.) and working memory as described above. The non-transitory computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services or other elements located within at least one working memory device, including an operating system and application programs, such as a client application or browser. It should be appreciated that alternate embodiments may have numerous variations from that described above. For example, customized hardware might also be used and/or particular elements might be implemented in hardware, or software (including portable software, such as applets) implemented by hardware. Further, connection to other computing devices such as network input/output devices may be employed.

Non-transitory storage media and computer-readable media for containing code, or portions of code, can include any appropriate media known or used in the art, including storage media and communication media such as, but not limited to, volatile and non-volatile, removable and non-removable media implemented in any method or technology for storage and/or transmission of information such as computer-readable instructions, data structures, program modules or other data, including RAM, ROM, EEPROM, flash memory or other memory technology, CD-ROM, DVD, or other optical storage, magnetic cassettes, magnetic tape, magnetic disk storage or other magnetic storage devices or any other medium which can be used to store the desired information and which can be accessed by a system device. Based on the disclosure and teachings provided herein, a person of skilled in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the disclosure to the specific form or forms disclosed, but on the contrary, the intention is to cover all modifications, alternative constructions and equivalents falling within the spirit and scope of the disclosure, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure.

Disjunctive language such as that included in the phrase "at least one of X, Y, or Z," unless specifically stated otherwise, is otherwise understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z in order for each to be present.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

Embodiments of this disclosure are described herein, including the best mode known to the inventors for carrying out the disclosure. Variations of those embodiments may become apparent to those skilled in the art upon reading the foregoing description. The inventors expect skilled artisans to employ such variations as appropriate, and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

What is claimed is:

1. A computer-implemented method comprising:
    determining, by a computer system, an opportunity cost over a plurality of time periods for using a capacity to store a particular item of a plurality of items of a same category, the capacity associated with inventorying the plurality of items of the same category offered at an electronic marketplace and comprising a receipt capacity for receiving the items in an inventory associated with the electronic marketplace and a storage capacity for storing the items in the inventory, and the opportunity cost determined based at least in part on lost sales of other items of the plurality of items of the same category;
    simulating, by the computer system, a consumption of the capacity in association with a demand for the particular item from the items based at least in part on the opportunity cost to store the particular item and a set of parameters comprising a merchant capacity of a merchant to provide the particular item, the simulated consumption associated with an initial time period of the plurality of time periods and accounting for the opportunity cost over the plurality of time periods;
    detecting, by the computer system, that a discrepancy between the simulated consumption and the capacity fails a convergence criterion;
    updating, by the computer system, the opportunity cost to an updated opportunity cost based at least in part on the discrepancy failing the convergence criterion;
    re-simulating, by the computer system, the consumption based at least in part on the updated opportunity cost and the set of parameters;
    detecting, by the computer system, that an updated discrepancy between the re-simulated consumption and the capacity satisfies the convergence criterion; and
    generating, by the computer system in response to the convergence criterion being satisfied, a decision to add units of the item to the inventory during the initial time period based at least in part on the updated opportunity cost.

2. The computer-implemented method of claim 1, wherein accessing the opportunity cost comprises initializing the opportunity cost based at least in part on a previous opportunity cost associated with a plurality of previous time periods and setting the initialized opportunity cost as a parameter for simulating the consumption.

3. The computer-implemented method of claim 1, wherein the merchant capacity is associated with the initial time period, and wherein the merchant capacity is determined based at least in part on a past performance associated with inventorying items from the merchant during a corresponding past time period relative to past performances corresponding to a plurality of past time periods.

4. The computer-implemented method of claim 1, wherein the discrepancy indicates an over-use of the capacity, and wherein updating the opportunity cost comprises increasing the opportunity cost based at least in part the over-use.

5. One or more computer-readable storage media storing computer-executable instructions that, when executed by one or more computing systems, configure the one or more computing systems to perform operations comprising:
    detecting a discrepancy between a consumption of a capacity and the capacity, the consumption determined based at least in part on a simulated demand for an item, the capacity associated with inventorying items of a same category;

determining an opportunity cost for using the capacity to store the item, the opportunity cost determined based at least in part on lost sales of other items of the items of the same category;

updating the opportunity cost associated with the capacity to an updated opportunity cost based at least in part on determining that the discrepancy fails a convergence criterion, the opportunity cost indicative of a value associated with using the capacity for inventorying the items;

simulating the consumption based at least in part on a set of parameters comprising the updated opportunity cost and a merchant capacity to provide the item;

detecting that a resulting discrepancy between the simulated consumption and the capacity meets the convergence criterion; and generating a decision to acquire units of the item based at least in part on the updated opportunity cost.

6. The one or more computer-readable storage media of claim 5, wherein the opportunity cost is associated with a category of items comprising the item, wherein the consumption is associated with simulated demand for the item, wherein simulating the consumption comprises optimizing an objective function based at least in part on an inventory level for the item, and wherein updating the opportunity cost is based at least in part on the inventory level of the item.

7. The one or more computer-readable storage media of claim 5, wherein simulating the consumption comprises using an objective function based at least in part on the set of parameters.

8. The one or more computer-readable storage media of claim 7, wherein using the objective function comprises optimizing the objective function based at least in part on Lagrange multipliers associated with the opportunity cost.

9. The one or more computer-readable storage media of claim 8, wherein an optimal inventory level for the item is determined based at least in part on the Lagrange multipliers.

10. The one or more computer-readable storage media of claim 7, wherein using the objective function comprises optimizing the objective function for at least one parameter of the set of parameters, wherein the at least one parameter comprises a profit, wherein optimizing the objective function comprises determining an optimal inventory level for the item that maximizes the profit based at least in part on iteratively setting an inventory level for the item, simulating the demand for the item, and determining the profit.

11. The one or more computer-readable storage media of claim 10, wherein the consumption of the capacity is determined based at least in part on the optimal inventory level, wherein updating the opportunity cost comprises decreasing the opportunity cost if the discrepancy between the consumption and the capacity indicates an under-use of the capacity, and wherein the decreasing of the opportunity cost causes an increase in the optimal inventory level.

12. The one or more computer-readable storage media of claim 7, wherein updating the opportunity cost comprises optimizing the objective function based at least in part on a sub-gradient algorithm.

13. The one or more computer-readable storage media of claim 12, wherein the opportunity cost is updated based at least in part on at least one of a step-size and a direction determined by the sub-gradient algorithm.

14. A system comprising:
a memory configured to store computer-executable instructions; and
a processor configured to access the memory and execute the computer-executable instructions to collectively at least:
  determine an opportunity cost for using a capacity to store an item;
  detect a discrepancy between a consumption of the capacity and the capacity, the consumption determined based at least in part on a simulated demand for the item to be inventoried and the opportunity cost, the opportunity cost indicative of a value associated with using the capacity to inventory a category of items comprising the item and determined based at least in part on lost sales of other items of the category of items;
  update the opportunity cost to an updated opportunity cost based at least in part on the discrepancy;
  simulate the consumption based at least in part on the updated opportunity cost;
  determine that the discrepancy satisfies a convergence criterion based at least in part on an update to the consumption based at least in part on simulating the consumption; and
  in response to the determination that the discrepancy satisfies the convergence criterion, generate a decision to inventory units of the item based at least in part on the updated opportunity cost.

15. The system of claim 14, wherein detecting the discrepancy, updating the opportunity cost, and simulating the consumption are iteratively repeated until the convergence criterion is satisfied.

16. The system of claim 15, wherein the convergence criterion is satisfied based at least in part on at least one of: an acceptable range of discrepancies, a direction of the discrepancy between multiple simulations, a scale of change in the discrepancy between the multiple simulations, or a change to an objective function used in the simulate.

17. The system of claim 15, wherein simulating the consumption comprises iteratively searching for an inventory level based at least in part on a stochastic approximation using an objective function, wherein the iteratively searching is complete when an inner convergence criterion is met based at least in part on one or more of: a harmonic step-size rule, a McClain step-size rule, a Kesten step-size rule, or a bias-adjusted Kalman filter step-size rule.

18. The system of claim 14, wherein the opportunity cost and the capacity are associated with a plurality of time periods and with the category of items, wherein the decision to inventory the units of the item is associated with a particular time period of the plurality of time periods and with the item, and wherein the decision is based at least in part on the capacity over the plurality of time periods and a plurality of items from the category of items.

19. The system of claim 18, wherein the plurality of time periods comprises a peak demand time period, and wherein the decision to inventory the units of the item comprises at least one of an early order or a late order of the units based at least in part on the opportunity cost to account for the capacity during the peak demand time period.

20. The system of claim 19, wherein the opportunity cost is increased during the peak demand time period relative to the particular time period.

* * * * *